US010233910B2

(12) United States Patent
Mazzeo et al.

(10) Patent No.: US 10,233,910 B2
(45) Date of Patent: *Mar. 19, 2019

(54) FLEXIBLE THIN ROBOTIC ACTUATORS

(71) Applicant: President and Fellows of Harvard College, Cambridge, MA (US)

(72) Inventors: Aaron D. Mazzeo, Duenellen, NJ (US); Stephen A. Morin, Lincoln, NE (US); Robert F. Shepherd, Brooktondale, NY (US); George M. Whitesides, Newton, MA (US); William B. Kalb, Cambridge, MA (US)

(73) Assignee: President and Fellows of Harvard College, Cambridge, MA (US)

( * ) Notice: Subject to any disclaimer, the term of this patent is extended or adjusted under 35 U.S.C. 154(b) by 20 days.

This patent is subject to a terminal disclaimer.

(21) Appl. No.: 15/362,334

(22) Filed: Nov. 28, 2016

(65) Prior Publication Data

US 2017/0314538 A1 Nov. 2, 2017

Related U.S. Application Data

(63) Continuation of application No. 14/329,506, filed on Jul. 11, 2014, now Pat. No. 9,506,455, which is a
(Continued)

(51) Int. Cl.
*F03G 7/06* (2006.01)
*F15B 15/10* (2006.01)
(Continued)

(52) U.S. Cl.
CPC .............. *F03G 7/06* (2013.01); *B25J 9/1075* (2013.01); *B25J 9/142* (2013.01); *F15B 15/103* (2013.01)

(58) Field of Classification Search
CPC . F03G 7/06; F15B 15/103; B25J 9/142; B25J 9/1075
(Continued)

(56) References Cited

U.S. PATENT DOCUMENTS 2,632,475 A 3/1953 Arpad
4,776,852 A 10/1988 Bubic
(Continued)

FOREIGN PATENT DOCUMENTS

DE 19617852 A1 10/1997
EP 1190819 A1 3/2002
(Continued)

OTHER PUBLICATIONS

Hamlen, R. P. et al., "Electrolytically Activated Contractile Polymer," Nature, vol. 206, pp. 1149-1150 (Jun. 12, 1965).
(Continued)

*Primary Examiner* — Hoang Nguyen
(74) *Attorney, Agent, or Firm* — Wilmer Cutler Pickering Hale and Dorr LLP

(57) ABSTRACT

Some embodiments of the disclosed subject matter includes a laminated robotic actuator. The laminated robotic actuator includes a strain-limiting layer comprising a flexible, non-extensible material in the form of a sheet or thin film, a flexible inflatable layer in the form of a thin film or sheet in facing relationship with the strain-limiting layer, wherein the inflatable layer is selectively adhered to the strain-limiting layer, and wherein a portion of an un-adhered region between the strain-limiting layer and the inflatable layer defines a pressurizable channel, and at least one fluid inlet in fluid communication with the pressurizable channel. The first flexible non-extensible material has a stiffness that is
(Continued)

greater than the stiffness of the second flexible elastomeric material and the flexible elastomer is non-extensible under actuation conditions.

20 Claims, 18 Drawing Sheets

Related U.S. Application Data continuation of application No. PCT/US2013/022593, filed on Jan. 22, 2013.

(60) Provisional application No. 61/588,596, filed on Jan. 19, 2012.

(51) Int. Cl.
    *B25J 9/10*     (2006.01)
    *B25J 9/14*     (2006.01)

(58) Field of Classification Search
    USPC ..... 92/92, 93, 96, 104, 105, 103 SD; 29/454
    See application file for complete search history.

(56) References Cited

U.S. PATENT DOCUMENTS

| | | |
|---|---|---|
| 5,080,000 A | 1/1992 | Bubic et al. |
| 6,067,892 A | 5/2000 | Erickson |
| 6,666,127 B2 * | 12/2003 | Peles .......................... A61F 2/68 623/26 |
| 6,868,773 B2 * | 3/2005 | Davis .................... F15B 15/103 92/153 |
| 9,506,455 B2 * | 11/2016 | Mazzeo ................. B25J 9/1075 |
| 2006/0028041 A1 * | 2/2006 | Ono ........................ B25J 9/142 294/119.3 |

FOREIGN PATENT DOCUMENTS

| | | |
|---|---|---|
| JP | H02-113104 A | 4/1990 |
| JP | H05-015485 | 1/1993 |
| JP | 3756178 B2 | 3/2006 |
| JP | 2008-157644 A | 7/2008 |
| WO | WO-98/49976 A1 | 11/1998 |
| WO | WO-2012/148472 A2 | 11/2012 |

OTHER PUBLICATIONS

International Search Report and Written Opinion issued by the International Searching Authority for International Application No. PCT/US2013/022593 dated Jul. 5, 2013 (10 pages).

Kuhn, W. et al., "Reversible Dilation and Contraction by Changing the State of Ionization of High-Polymer Acid Networks," Nature, vol. 165, pp. 514-516 (Apr. 1, 1950).

Otake, M. et al., "Motion design of a starfish-shaped gel robot made of electro-active polymer gel," Robotics and Autonomous Systems, vol. 40, pp. 185-191 (2002).

Suzumori, Koichi, "Elastic materials producing compliant robots," Robotics and Autonomous Systems, vol. 18, pp. 135-140 (1996).

* cited by examiner

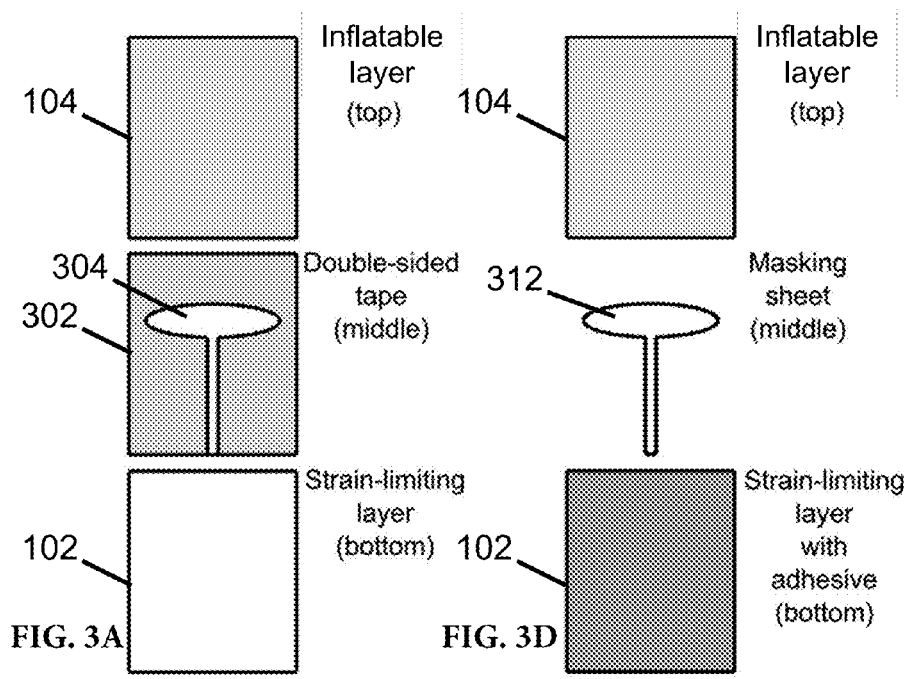
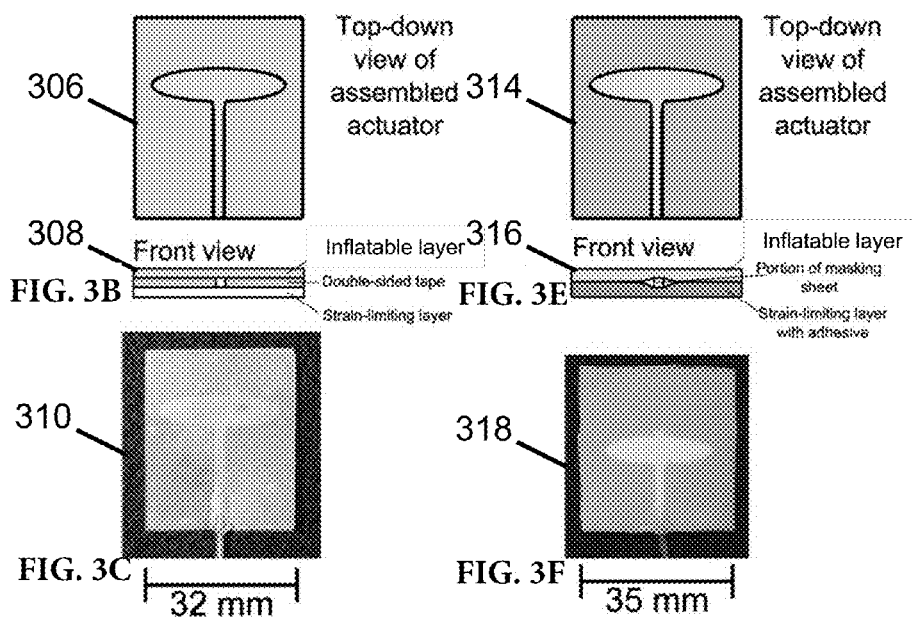

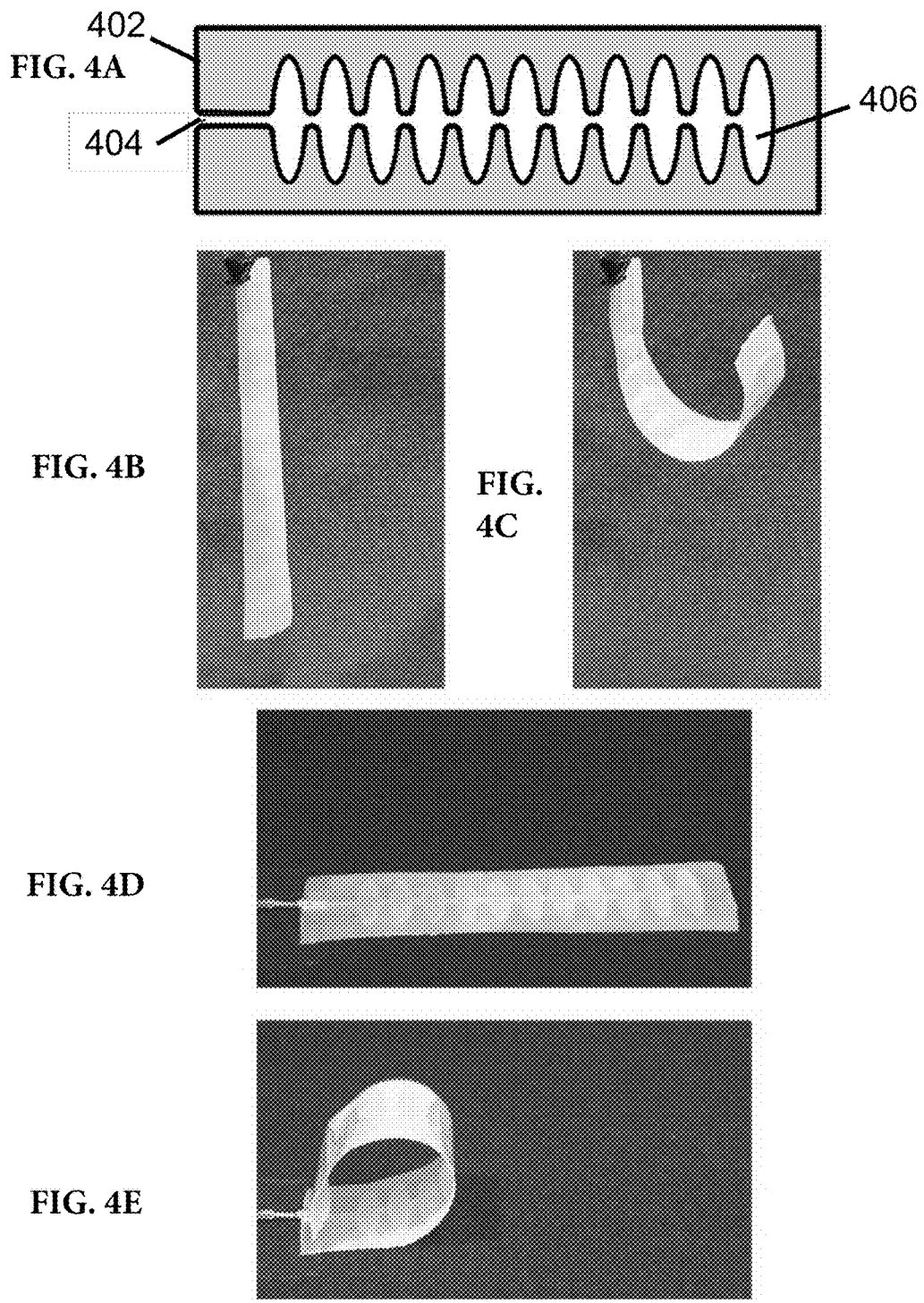

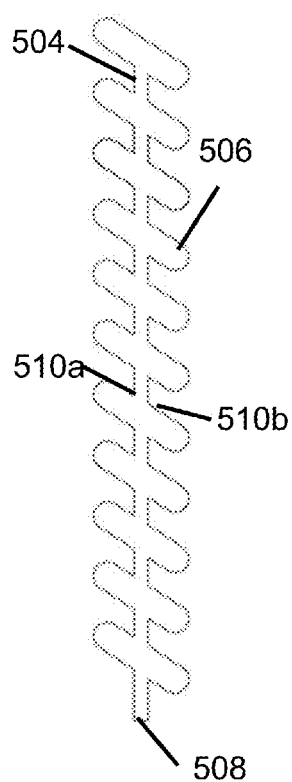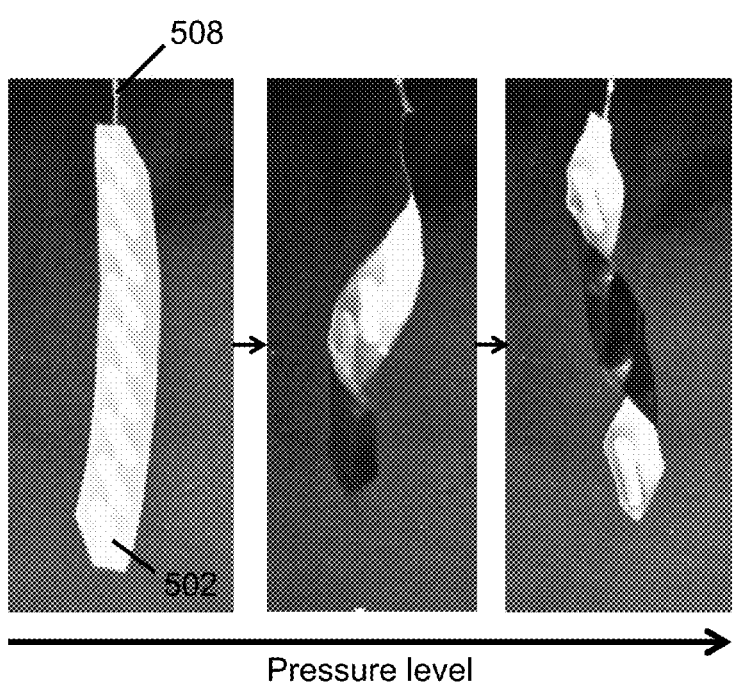
FIG. 5A
FIG. 5B

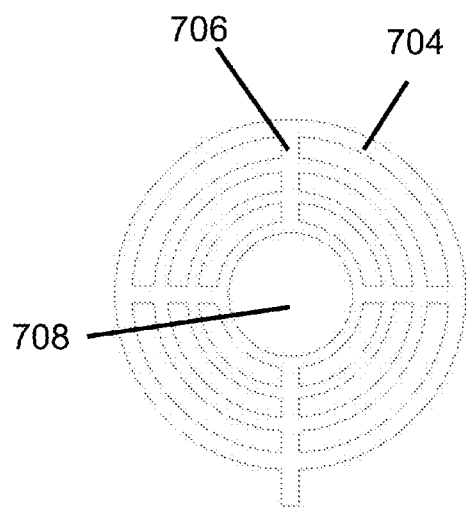
FIG. 7A
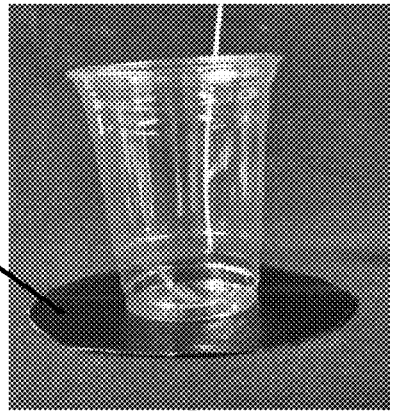
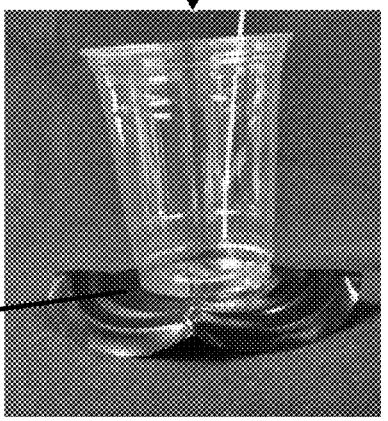
FIG. 7B

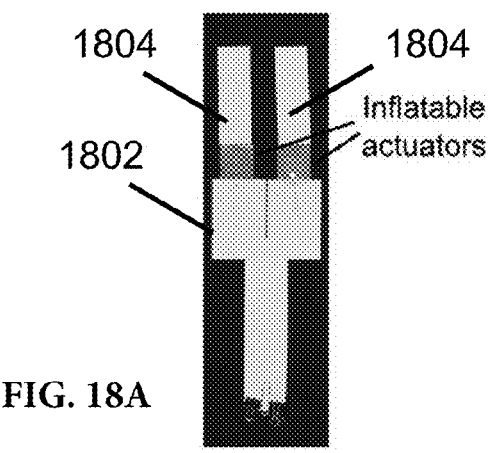
FIG. 18A
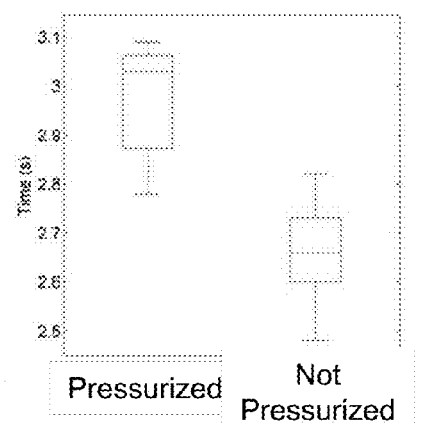
FIG. 18B
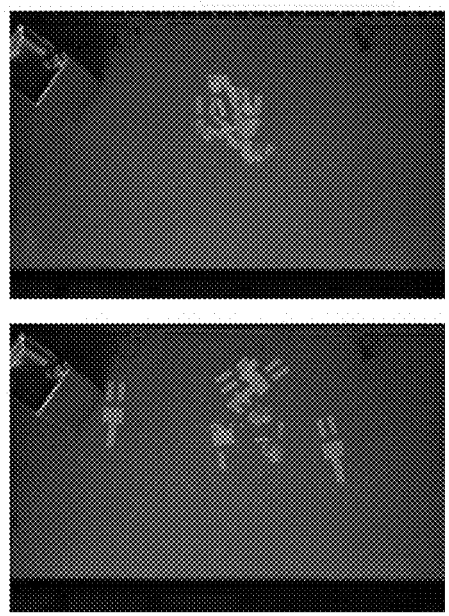
FIG. 18C
FIG. 18D

FLEXIBLE THIN ROBOTIC ACTUATORS

CROSS-REFERENCE TO RELATED APPLICATIONS

This application is a continuation application of the U.S. patent application Ser. No. 14/329,506, titled "Flexible Robotic Actuators," filed on Jul. 11, 2014, which is a continuation of PCT Application No. PCT/US2013/022593, titled "Flexible Robotic Actuators," filed on Jan. 22, 2013, which claims the benefit of the U.S. Provisional Patent Application No. 61/588,596, titled "Flexible Robotic Actuators," filed on Jan. 19, 2012. Each of the above applications is hereby incorporated by reference herein in its entirety.

All patents, patent applications and publications cited herein are hereby incorporated by reference in their entirety in order to more fully describe the state of the art as known to those skilled therein as of the date of the invention described herein.

STATEMENT REGARDING FEDERALLY SPONSORED RESEARCH OR DEVELOPMENT

The present invention was made with United States government support under Grant No. W911NF-11-1-0094 awarded by Defense Advanced Research Projects Agency (DARPA). The United States government has rights in this invention.

BACKGROUND

This technology relates generally to flexible actuators. In particular, this invention relates to substantially thin robotic manipulators.

Most robots are constructed using so-called "hard" body plans; that is, a rigid (usually metal) skeleton, electrical or hydraulic actuation, electromechanical control, sensing, and feedback. These robots are very successful at the tasks for which they were designed (e.g., heavy manufacturing in controlled environments) but have severe limitations when faced with more demanding tasks (for example, stable motility in demanding environments): tracks and wheels perform less well than legs and hooves.

Evolution has selected a wide range of body plans for mobile organisms. Many approaches to robots that resemble animals with skeletons are being actively developed: "Big Dog" is an example. A second class of robot—those based on animals without skeletons—are much less explored, for a number of reasons: i) there is a supposition that "marine-like" organisms (squid) will not operate without the buoyant support of water; ii) the materials and components necessary to make these systems are not available; iii) the major types of actuation used in them (for example, hydrostats) are virtually unused in conventional robotics. These systems are intrinsically very different in their capabilities and potential uses than hard-bodied systems. While they will (at least early in their development) be slower than hard-bodied systems, they will also be more stable and better able to move through constrained spaces (cracks, rubble), lighter, and less expensive.

Robots, or robotic actuators, which can be described as "soft" are most easily classified by the materials used in their manufacture and their methods of actuation. The field of soft robotic actuation began with work by Kuhn et al in 1950. Their work focused on the reversible change in the coiling and uncoiling of a polymeric material dependant on the pH of the surrounding medium. They used this to successfully raise and lower a weight, thus showing proof of principle for the use of soft materials in robotic actuation. Hamlen et al expanded upon this idea in 1965 and showed that polymeric materials can be made to contract electrolytically. These two developments set the scene for future work using the swelling of polymeric gels and electronic control of dielectric-based actuators. Otake et al have demonstrated the use of electro-active polymers in the manufacture of starfish-shaped robotic actuators. Pneumatically-driven soft actuators based on pressurization of sealed chambers fabricated from extensible polymers were first reported by Suzumori et al in 1991. This type of actuation has been used on the millimeter scale to fabricate grippers, tentacles, and other related devices including pneumatic balloon actuators.

Pneumatic soft robotic actuators can be manufactured using inextensible materials, which rely on architectures such as bellows. McKibben actuators, also known as pneumatic artificial muscles (PMAs), rely on the inflation of a bladder constrained within a woven sheath which is inextensible in the axis of actuation. The resultant deformation leads to radial expansion and axial contraction; the force that can be applied is proportional to the applied pressure. Related actuators are called pleated pneumatic artificial muscles.

There are "soft" robotic actuators such as shape memory alloys which have been used by Sugiyama et al both as the actuation method and as the main structural component in robots which can both crawl and jump. Another approach, which can be described as "soft" uses a combination of traditional robotic elements (an electric motor) and soft polymeric linkages based on Shape Deposition Manufacturing (SDM). This technique is a combination of 3D printing and milling. An example of a composite of traditional robotics with soft elements has been used with great success in developing robotic grippers comprising soft fingers to improve the speed and efficiency of soft fruit packing in New Zealand.

SUMMARY

Flexible robotic actuators are described. These and other aspects and embodiments of the disclosure are illustrated and described below.

The disclosed subject matter includes a laminated robotic actuator. The laminated robotic actuator can include a strain-limiting layer comprising a flexible, non-extensible material in the form of a sheet or thin film, a flexible inflatable layer in the form of a thin film or sheet in facing relationship with the strain-limiting layer, wherein the inflatable layer is selectively adhered to the strain-limiting layer, and wherein a portion of an un-adhered region between the strain-limiting layer and the inflatable layer defines a pressurizable channel, and at least one fluid inlet in fluid communication with the pressurizable channel. The first flexible non-extensible material has a stiffness that is greater than the stiffness of the second flexible elastomeric material and the flexible elastomer is non-extensible under actuation conditions.

In any of the embodiments described herein, the laminated robotic actuator can include an adhesive layer disposed between the strain-limiting layer and the inflatable layer, wherein the adhesive layer is shaped to selectively adhere the inflatable layer to the strain-limiting layer to define the channel.

In any of the embodiments described herein, one of the strain-limiting layer and the inflatable layer is coated with an adhesive, and the laminated robotic actuator further includes a masking layer disposed between the strain-limiting layer and the inflatable layer, wherein the masking layer defines a shape of the un-adhered region between the strain-limiting layer and the inflatable layer.

In any of the embodiments described herein, the strain-limiting layer includes the adhesive coating.

In any of the embodiments described herein, the channel includes a plurality of interconnected chambers configured to provide a twisting motion of the flexible robotic actuator upon pressurization of the channel via the fluid inlet.

In any of the embodiments described herein, the channel includes a plurality of interconnected chambers configured to provide a bending motion of the flexible robotic actuator upon pressurization of the channel via the fluid inlet.

In any of the embodiments described herein, a stiffness of the strain-limiting layer is configured to determine a physical strength associated with the flexible robotic actuator upon pressurization of the channel via the fluid inlet.

In any of the embodiments described herein, the channel includes a plurality of interconnected chambers configured to provide two different motions of the flexible robotic actuator upon pressurization of the channel via the fluid inlet.

In any of the embodiments described herein, the actuator further includes a reinforcing structure for providing additional physical support to the flexible robotic actuator.

In any of the embodiments described herein, the channel includes a plurality of sub-channels that are independently coupled to the at least one fluid inlet, thereby enabling independent pressurization of the sub-channels.

In any of the embodiments described herein, the channel includes a plurality of interconnected chambers arranged along a curved central flow conduit.

The disclosed subject matter also includes a twisting actuator comprising a flexible robotic actuator in accordance with any of the embodiments described herein. The pressurizable channel includes a central flow conduit and a plurality of slanted branches, and the slanted branches are at an acute angle with respect to a central axis of the actuator to determine a twisting motion of the actuator.

In any of the embodiments described herein, the central axis of the twisting actuator is aligned with the central flow conduit.

The disclosed subject matter also includes a lifting robot. The lifting robot includes a flexible robotic actuator in accordance with any of the embodiments described herein. The pressurizable channel includes radial channels arranged in a concentric manner about a central point of the flexible robotic actuator, and connecting channels perpendicular to the radial channels, wherein the radial channels are configured to deflect away from a surface of the strain-limiting layer upon pressurization.

The disclosed subject matter also includes a robot comprising a plurality of actuatable arms in accordance with any of the embodiments described herein, wherein each of the plurality of actuatable arms includes a flexible robotic actuator in accordance with any of the embodiments described herein.

In any of the embodiments described herein, the robot includes 2, 3, 4, 5, 6, 7, 8 or more actuatable arms.

In any of the embodiments described herein, one or more of the plurality of actuatable arms is configured to be actuated independently.

The disclosed subject matter also includes a gripping device comprising a plurality of actuatable arms. Each of the plurality of actuatable arms includes a flexible robotic actuator in accordance with any of the embodiments described herein, wherein the plurality of actuatable arms are configured to bend from a first resting position to a second actuated position upon pressurization.

In any of the embodiments described herein, the gripping device includes 2, 3, 4, 5, 6, 7, 8 or more actuatable arms.

In any of the embodiments described herein, one or more of the plurality of actuatable arms is configured to be actuated independently.

The disclosed subject matter also includes a method for providing a flexible robotic actuator. The method includes providing a strain-limiting layer having a substantially two-dimensional layer of a first flexible material, providing an inflatable layer having a substantially two-dimensional layer of a second flexible material, wherein the second flexible material is non-extensible, and the first flexible material is stiffer compared to the second flexible material, and determining a shape of a region at which the inflatable layer is to be adhered to the strain-limiting layer. The method can further include adhering the inflatable layer to the strain-limiting layer based on the shape of the region, thereby forming a channel for fluid communication having the shape.

In any of the embodiments described herein, the method for providing a flexible robotic actuator can also include providing an adhesive layer between the strain-limiting layer and the inflatable layer, wherein the adhesive layer is shaped to selectively adhere the inflatable layer to the strain-limiting layer to define the channel.

In any of the embodiments described herein, the method for providing a flexible robotic actuator can also include providing a masking layer disposed between the strain-limiting layer and the inflatable layer, wherein the masking layer defines a shape of the un-adhered region between the strain-limiting layer and the inflatable layer.

The disclosed subject matter includes a method of actuating a laminated soft robotic. The method can include providing a laminated soft robotic in accordance with any of the embodiments described herein, and initiating a series of pressurizations and depressurizations that actuate the laminated soft robotic to provide a predetermined motion.

In any of the embodiments described herein, the series of pressurization and depressurizations provide a sequence of two or more predetermined motions.

The disclosed subject matter includes a method of gripping. The method of gripping can include providing a gripping device in accordance with any of the embodiments described herein, and initiating a series of pressurizations and depressurizations that bring the arms in gripping contact with a target object.

In any of the embodiments described herein, the method of gripping can also include initiating a series pressurizations and depressurizations to perform a walking motion.

In any of the embodiments described herein, the pressure of the fluid applied to the channel via the fluid inlet is selected to provide a predetermined range of a motion.

BRIEF DESCRIPTION OF THE DRAWINGS

The invention is described with reference to the following figures, which are presented for the purpose of illustration only and are not intended to be limiting.

FIGS. 3A-3F illustrate methods for fabricating flexible robotic actuators in accordance with some embodiments.

FIGS. 4A-4E illustrate a flexible, curling actuator in accordance with some embodiments.

FIGS. 5A-5B illustrate a twisting thin soft robot and its movement in accordance with some embodiments.

FIGS. 7A-7B illustrate a lifting thin robot that is configured to lift an object on the robot in accordance with some embodiments.

FIGS. 18A-18D illustrates a paper-based rotor with two flexible actuators in accordance with some embodiments.

DETAILED DESCRIPTION

Figure 1A:
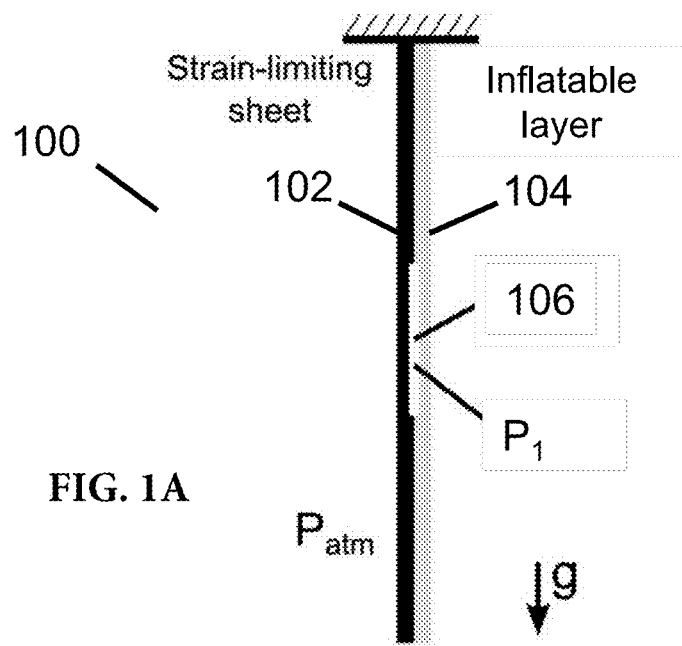
FIGS. 1A-1B illustrate the principle of pneumatic actuation of a flexible robotic actuator in accordance with some embodiments.

Organisms, such as Echinoderms (starfish, sea urchins) and Cnidarians (jellyfish) are ancient and incredibly successful, relatively simple organisms capable of movement unheard of in even the most advanced hard-robotic systems. One major reason for the gap between nature and the state of the art robotic systems is the severe limitation in material selection available for robotics. To bridge this gap between nature and the state of the art robotic systems, robotic systems have exploited different materials. For example, a soft robotic system can use soft materials, such as soft elastomer, to build its structures, as disclosed in the PCT Patent Application No. PCT/US11/61720, titled "Soft robotic actuators" by Shepherd et al., filed on Nov. 21, 2011, which is hereby incorporated by reference in its entirety.

The present disclosure provides a different approach to bridging the gap between nature and the state of the art robotic systems. In particular, disclosed systems and methods provide laminated robotic actuators. Some embodiments of the flexible robotic actuators include a stack of substantially two-dimensional (thin film or sheet) materials that are arranged to form an internal set of pressurizable pathways, which can be configured to provide three-dimensional motions. The thin actuators can be fabricated quickly using cheap materials and cheap processes. The actuators only require two non-extensible layers having a differing stiffness and (optionally) an adhesive layer that secures the two layers together. The strength and the flexibility of the actuator can be easily controlled by varying the materials used for the two layers having a different stiffness. Furthermore, the arrangement and shape of the pressurizable pathways can be prepared in multiple ways, thereby enabling different motions and applications.

These thin, flexible actuators can provide distinct advantages compared to other robotic actuators. For example, thin actuators can be easy to store and transport, and can be configured to maneuver adeptly on flat surfaces. Furthermore, thin actuators can be lightweight and can enable developments of advanced aerodynamic structures and synthetic marine organisms. In addition, thin actuators can be configured to operate in narrow spaces unlike other robotic systems, thereby providing robotic support in "search and rescue missions". The thin actuators can be particularly useful in dealing with crevasses, objects in a packed setting, or thin objects, obstacles, or cracks in general. For example, it would be challenging for regular soft robotic actuators to grab one of the eggs in a basket because the space between the eggs is limited and the actuator would not "fit" into the limited space. In contrast, it would be easy for thin actuators to grab one of the eggs in a basket since the thin actuator can fit into the limited space.

The thin, flexible actuators can be useful in a variety of applications. In particular, the thin, flexible actuators can be useful in biomedical applications. The thin, flexible actuators can be used as a surgical tool for delicately manipulating and operating on organs. For example, the flexible actuators can be inserted into narrow incisions and are able to delicately separate organs for a better line of sight. Because existing surgical tools are rigid and hard, if mishandled during operation, the existing tools can cut organs or cause unnecessary medical complications. In contrast, since the thin actuators can be soft and flexible, thin actuator based surgical tools are less likely to cause medical complications.

FIG. 1 illustrates a structure of a laminated robotic actuator and its principle of actuation in accordance with some embodiments. The flexible robotic actuator 100 can include a plurality of layers stacked on top of each other. Each layer can be substantially two-dimensional and is in the form of a sheet, layer or thin film. A substantially two-dimensional layer can be characterized as a material having a width, height, and thickness, where the thickness of the material is substantially smaller than the material's width and height. In some cases, the ratio between the smaller of the width and height of the layer and the thickness of the layer can be defined as a form factor. In some embodiments, the form factor of the substantially two-dimensional layer is at least 5. In other embodiments, the form factor of the substantially two-dimensional layer is at least 10. In yet another embodiment, the form factor of the substantially two-dimensional layer is at least 20. In yet another embodiment, the form factor of the substantially two-dimensional layer is at least 50. In yet another embodiment, the form factor of the substantially two-dimensional layer is at least 100. In yet another embodiment, the form factor of the substantially two-dimensional layer is at least 200. In yet another embodiment, the form factor of the substantially two-dimensional layer is at least 500. In yet another embodiment, the form factor of the substantially two-dimensional layer is at least 1000. In yet another embodiment, the form factor of the substantially two-dimensional layer is at least 2000. In yet another embodiment, the form factor of the substantially two-dimensional layer is at least 5000.

The flexible robotic actuator can include a strain-limiting layer 102 and an inflatable layer 104. The strain-limiting layer can limit various types of strains, including a strain resulting from bending, expanding, and/or twisting. Bending, expanding, and twisting strains can apply uniform or anisotropic tensile stress to the strain-limiting layer, and the strain-limiting layer can resist this tensile stress until its yield strength is reached. In some embodiments, the materials for the strain-limiting layer 102 and the inflatable layer 104 can be selected to satisfy certain mechanical characteristics, such as the physical strength of the actuator upon actuation.

The strain-limiting layer 102, due in part to its thin, 2-dimensional form factor, is made of a flexible material, e.g., is capable of bending without damage to the layer, but is it relatively stiff, e.g., it is resistant to stretching or expansion. In some cases, the stiffness of the strain-limiting layer can determine the physical strength associated with the flexible robotic actuator upon actuation.

The strain-limiting layer is made of a stiffer material compared to that of the inflatable layer 104. For example, the strain-limiting layer 102 can include a packaging tape, and a Gorilla Tape®. The strain-limiting layer 102 can include an extensive range stiff, inextensible materials, including a stiff polymer, such as polyethylene terephthalate (PET), a synthetic fiber, a duct tape, Kevlar©, and a fabric such as paper, cotton, and nylon. Suitable thickness is selected based on the desired material properties of the material. For example, a thicker sheet will be stiffer and provide higher bending resistance, requiring a greater actuation force, but greater robot strength. Exemplary thicknesses can range from tens of micro-meters to a few milli-meters. Such materials are readily available in sheet and thin film format and can be incorporated into the assembly process without any additional resizing or reprocessing. For example, packaging tapes are commercially available in thicknesses ranging from 1 mil (ca. 25 µm to 4 mil (ca. 100 µm) in thickness; PET films are commercially sold in thicknesses ranging from 10 µm to 1-2 mm.

The inflatable layer 104 is fabricated using a flexible material having a stiffness that is less than that of the strain-limiting layer 102. Therefore, the inflatable layer 104 bends or deforms more readily compared to the strain-limiting layer 102. In some cases, the stiffness of a structure can depend on its material and its shape. Thus, the stiffness of the inflatable layer 104 can be controlled by selecting an adequate material and an adequate shape. In some embodiments, the material for the inflatable layer 104 preferably possesses a sufficiently high Young's modulus that it does not expand significantly under the pressurizing conditions of actuation. Thus, the material for the inflatable layer 104 bends more readily than the strain-limiting material 102, but does not stretch or expand (as a balloon) under the actuation pressures. In some cases, the actuation pressure can be controlled so that the inflatable layer 104 does not expand or stretch. For example, the actuation pressure applied to the actuator can be between 2 psi and 10 psi. The range of pressure that can be applied to the actuator while preventing the expansion or stretching of the inflatable layer 104 can depend on the Young's modulus of the material used for the inflatable layer 104 and the adhesion strength of the adhesive between the inflatable layer 104 and the strain limiting layer 102. In some embodiments, the inflatable layer 104 can be formed using the same material as the strain-limiting layer 102. In such embodiments, the inflatable layer 104 can be thinner than the strain-limiting layer 102 to exhibit less stiffness compared to the strain-limiting layer 102.

Exemplary thicknesses of the inflatable layer 104 can range between tens of micro-meters to hundreds of micro-meters. Exemplary materials include an extensive range of less stiff materials, including a less-stiff polymers, such as a nitrile, a latex rubber, vinylidene chloride, and a low-density polyethylene. The polymers made from vinylidene chloride can include polyvinylidene chloride (PVDC), and Saran® PVDC film and Kevlar© polymer (poly-paraphenylene terephthalamide). Such materials are readily available in sheet and thin film format and can be incorporated into the assembly process without any additional resizing or reprocessing. For example, PDVC film is commercially available in thicknesses ranging from 1 mil (ca. 25 µm to 4 mil (ca. 100 µm) in thickness; PCV films are commercially sold in thicknesses ranging from 10 µm to 1-2 mm. In some embodiments, the inflatable layer 104 can be formed using the same material as the strain-limiting layer 102. In such embodiments, the inflatable layer 104 can be thinner than the strain-limiting layer 102 to exhibit less stiffness compared to the strain-limiting layer 102.

Portions of the strain-limiting layer 102 and the inflatable layer 104 can be selectively adhered to each other to form a single laminate structure having a plurality of layers, as illustrated in FIG. 1A. By "selectively adhered," it is meant that not all surfaces between the two layers are glued together. Regions remain unglued and non-adhering to the facing surface. The unadhered interface between the strain-limiting layer 102 and the inflatable layer 104 form a channel 106. As discussed in greater detail herein, the unglued, non-adhering regions are selected to define interconnecting chambers or channels that can be pressurized using a pressurizing source. Several ways of adhering the two layers can be used, as is discussed in greater detail below. The channel 106 can be substantially hollow and can be substantially contained or surrounded (i.e., compartmentalized) by the adhered interface between the strain-limiting layer 102 and the inflatable layer 104. Also, the channel 106 can be coupled to a fluid inlet and can be amenable to fluid communication. For example, the channel 106 can be in fluid communication with a pressure source via the fluid inlet, thereby receiving fluid from the pressure source. The pressure source can provide air, or, more generally, any types of fluid (e.g., water, oil).

A resting state is characterized as a state in which the pressure inside the channel ("$P_1$") is substantially identical to the pressure outside the chamber 106, such as the atmospheric pressure ("$P_{atm}$"). At a resting state, the channel 106 maintains its shape, as illustrated in FIG. 1A in accordance with some embodiments.

Figure 1B:
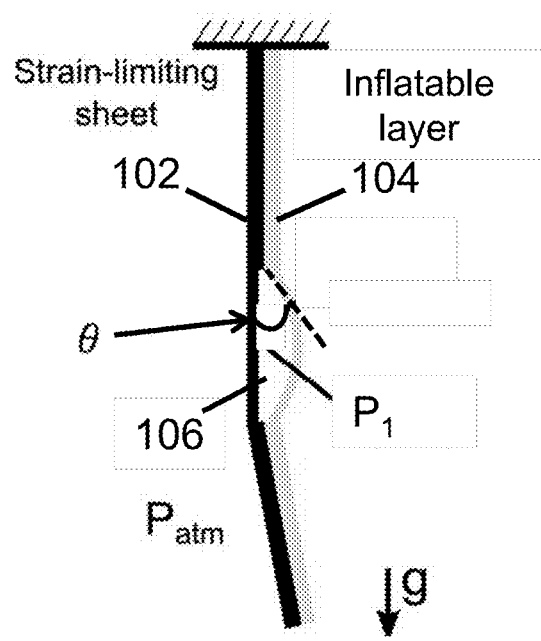

A pressurized state is characterized as a state in which the pressure inside the channel is greater than the pressure outside the chamber 106. At a pressurized state, the channel 106 can deform, as illustrated in FIG. 1B in accordance with some embodiments. The deformation of the channel 106 can depend on the stiffness of the two layers. Because the inflatable layer 104 is less stiff compared to the strain-limiting layer 102, the pressurized channel 106 would trigger the inflatable layer 104 to deform before the strain-limiting layer 102, thereby providing a bending motion.

The direction of the bending motion depends, in part, on the expansion property of the inflatable layer 104. For example, if the inflatable layer 104 is formed using an expansible material, then the inflatable layer 104 can be deformed and expanded, so that the surface area of the elastomer increases. Upon pressurization, the flexible robotic actuator 100 expands, increases its volume, and bends towards the strain-limiting layer 102, as disclosed in the PCT Patent Application No. PCT/US11/61720, titled "Soft robotic actuators" by Shepherd et al., filed on Nov. 21, 2011. In other words, the pressurization of the flexible robotic actuator 100 causes the actuator 100 to deflect towards the side of the strain-limiting layer 102.

In contrast, where the inflatable layer 104 is formed using a flexible, e.g., bendable, non-expansible material, the inflatable layer 104 can be deformed, e.g., bended, but cannot be expanded. Upon pressurization, the tension around the perimeter of the channel 106 on the inflatable layer 104 pulls the strain-limiting layer 102 at an angle substantially normal to the strain-limiting layer 102, which causes a bending motion towards the inflatable layer 104. When pressurized, the "contact angle" between the inflated portion of the inflatable layer 104 and the strain-limiting layer 102, shown as θ in FIG. 1B, is typically less than 90°, which indicates that the inflatable layer 104 places a tension on the strain-limiting layer 102 at the contact point, causing the bending motion. In other words, the pressurization of the flexible robotic actuator 100 having a non-extensible inflatable layer would cause the actuator 100 to deflect to the side of the inflatable layer 104.

Figure 2A:
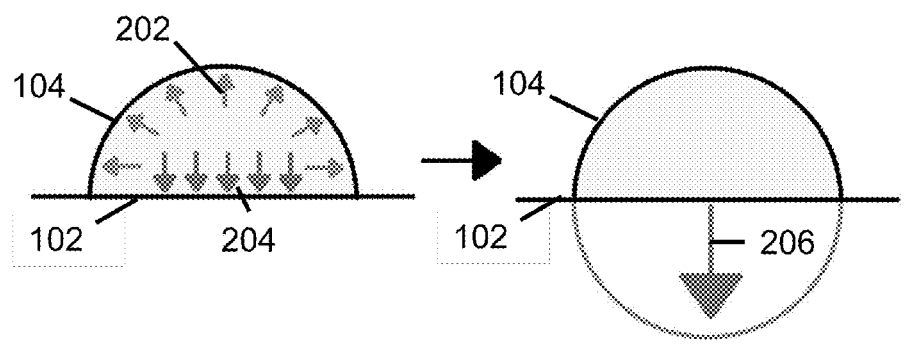
FIGS. 2A-2B illustrates a force diagram and a bending motion of a soft robot having a non-extensible inflatable layer in accordance with some embodiments.
Figure 2B:
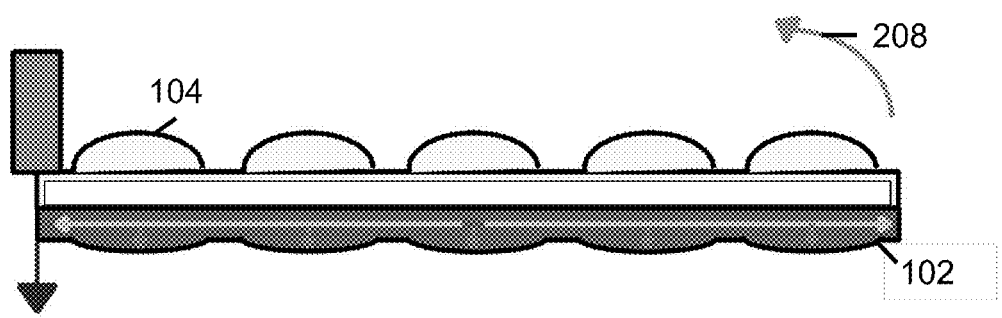

FIGS. 2A-2B provides a schematic illustration of the forces in play during pressurization of the laminated soft robotic actuator, demonstrating the bending motion of a soft robot having a non-extensible inflatable layer in accordance with some embodiments. FIG. 2A shows a cross-section of a pneumatic channel sealed by a strain-limiting layer 102 on one side and an inflatable layer 104 on the other. When the pneumatic channel is pressurized, the pressure would exert a force on the strain-limiting layer 102 and the inflatable layer 104. The forces are shown by vectors 202 and 204. The pressure induces the pneumatic channel to maximize volume while minimizing the surface area. Therefore, the pressure causes the non-extensible inflatable layer 104 to deflect outward and away from the strain-limiting layer 104. However, this pressure may not be enough to deflect the strain-limiting layer 102 outward and away from the inflatable layer 104 since the strain-limiting layer 102 is stiffer compared to the non-extensible inflatable layer 104. Therefore, the net force on the strain-limiting layer 102 would be a downward force, as shown by the large vector 206. This downward force on the strain-limiting layer 202, along with the effective shortening of the inflatable layer 104 through outward deflection, causes a bending motion in the direction towards the inflatable layer 104, as illustrated in FIG. 2B.

In some embodiments, operating the flexible robotic actuator using a high-pressure source is desirable because the force provided by the flexible actuator can be higher when actuated with a high-power pressure source. The maximum pressure that can be handled by the channel 106 depends on the properties of the strain-limiting layer 102 and the inflatable layer 104 and also on the strength of the attachment between the two layers. Therefore, it is sometimes desirable to secure a strong attachment between the two layers.

FIG. 3 illustrates two methods for fabricating a flexible robotic actuator in accordance with some embodiments. The first method imposes a thin layer having an adhesive coating on both sides 302 between the strain-limiting layer 102 and the inflatable layer 104, as illustrated in FIG. 3A. At a high level, the first method fabricates a flexible robotic actuator by adhering strain-limiting layer 102 and inflatable layer 104 to either side of adhesive layer 302. In some embodiments, adhesive layer 302 can be a double-sided tape such as is commercially available. Suitable double sided adhesive layers are available from a variety of sources, such as Scotch brand and 3M adhesive tapes. The adhesive layer 302 can be shaped, e.g., by cutting, punching, embossing, etc., to the desired shape of the channel 106. For example in FIG. 3A, a central portion 304 is removed from rectangular adhesive layer 302 to form a void space corresponding to channel 106. When the adhesive layer adheres the strain-limiting layer 102 to the inflatable layer 104, it does so at every facing position except for the central cutout portion 304. Therefore, the strain-limiting layer 102 at the central cutout portion 304 is not attached to the inflatable layer 104, and this un-attached interface between the strain-limiting layer 102 and the inflatable layer 104 forms a channel 106.

FIG. 3B shows the top-down view 306 and the front-view 308 of the actuator assembled in accordance with the first method. The adhesive layer 302 is disposed between the strain-limiting layer 102 and the inflatable layer 104, and the central cutout portion 304 forms the channel 106. FIG. 3C is a photograph of an actuator 310 fabricated in accordance with the first method.

The second method for fabricating a flexible robotic actuator uses a strain-limiting layer 102, an inflatable layer 104, and a masking layer 312, as illustrated in FIG. 3D. In some embodiments, this method uses a strain-limiting layer 102 with a surface that has thereon an adhesive. The adhesive on the strain-limiting layer 102 can be uniformly distributed across the surface of the strain-limiting layer 102 or can be selectively distributed (i.e., patterned) across the surface of the strain-limiting layer 102. The adhesive can similarly be applied to the inflatable layer in addition to or in place of the strain-limiting layer.

At a high level, the second method fabricates a flexible robotic actuator by adhering the strain-limiting layer 102 to the inflatable layer 104 using the adhesive on the top surface of the strain-limiting layer 102. To form a channel 106, some portions of the strain-limiting layer 102 can be selectively prevented from adhering to the inflatable layer 104 using a masking layer 312 (e.g., a patterned spacer). The masking layer 312 can prevent the physical contact of the two layers, and this un-attached interface between the strain-limiting layer 102 and the inflatable layer 104 forms a channel 106. In some embodiments, the adhesive can be present on the bottom surface of the inflatable layer 104 instead of the top surface of the strain-limiting layer 102; in other embodiments, the adhesive can be present on both the top surface of the strain-limiting layer 102 and the bottom surface of the inflatable layer 104. In some cases, the adhesive can include a double-sided tape or glue. In some embodiments, the strain-limiting layer 102 can include a single-sided tape that already has adhesive applied to it. In other embodiments, the inflatable layer 104 can include a single-sided tape that already has adhesive applied to it. The tape can include a duct tape, a box sealing tape, an electrical tape, a filament tape, a hockey tape, a medical tape, a slug tape, or a surgical tape.

FIG. 3E shows the top-down view 314 and the front-view 316 of the actuator assembled in accordance with the second method. The masking layer 312 is disposed between the strain-limiting layer 102 and the inflatable layer 104, forming the channel 106. FIG. 3F is a photograph of an actuator 318 fabricated in accordance with the second method.

The two methods illustrated in FIG. 3 are amenable to both easy prototyping and easy manufacturing. For example, for easy prototyping, different layers of the flexible actuator can be cut (i.e., shaped) using laser cutting techniques; for easy manufacturing, different layers of the flexible actuator can be cut using die cutting techniques that are already prevalent in industrial settings. Photolithographic techniques or other expensive and time-consuming processes are not needed.

The flexible robotic actuator can be designed to provide certain, sometimes complex, three-dimensional motions. For example, depending upon the number and arrangement of the pressurized channels and materials selected for the strain-limiting and elastomeric sheet, the laminated robotic actuator can perform bending, twisting, grabbing, and curling motions. Robotic actuators can be designed that incorporate one or more of these motions.

FIG. 4 illustrates a flexible, bending actuator in accordance with some embodiments. FIG. 4A shows the structure of the curling actuator 402. The curling actuator 402 includes a strain-limiting layer, an adhesive layer, and an inflatable layer. The strain-limiting layer is a polyester thin-film (i.e., PET) 50 micro-meters in thickness; the inflatable layer is a latex rubber sheet 150 micro-meters in thickness; and the adhesive layer is a double sided tape with a thickness of about 50 micro-meters. The adhesive layer is patterned (or cutout) so that when the tape adheres the strain-limiting layer to the inflatable layer, the interface between the two layers forms a plurality of interconnected channels 406. The plurality of interconnected channels 406 are configured to receive a pressurizing fluid via the fluid inlet 404. The fluid inlet 404 can be in fluid communication with a pressure source (not shown in the figure).

FIG. 4B shows the curling actuator 402 in its resting state, hanging from a clip. In its resting state, the curling actuator 402 is static and conforms to the gravity. In contrast, FIG. 4C illustrates the same curling actuator 402 in its pressurized state, pressurized with about 3 ml of pressurized air. In its pressurized state, the curling actuator 402 bends around the inflatable layer, working against gravity. The pressure applied to the curling actuator 402 can be controlled so that the inflatable layer 104 for the curling actuator 402 does not expand upon pressurization.

FIG. 4D illustrate a curling actuator 402 lying horizontally at its resting state, and FIG. 4E illustrate the same curling actuator 402 lying horizontally at its pressurized state, pressurized with about 3 ml of pressurized air. At its pressurized state, the curling actuator 402 curls around the inflatable layer, working against the gravity.

In some embodiments, a twisting motion of a thin actuator can be encoded into the shape of the channel. FIGS. 5A-5B illustrate a twisting laminated soft robot and its movement in accordance with some embodiments. FIG. 5A shows a channel embedded in a twisting thin soft robot 502. As illustrated in FIG. 5A, the twisting thin soft robot 502 can include a channel shaped as a tree, having a central flow conduit 504 with slanted branches 506. The angle of the slanted branches 506 with respect to a central axis of the robot can determine the motion of the thin soft robot as it receives pressurized air via a gas inlet 508. For the thin robot 502, the central axis is aligned with the a central flow conduit 504 of the channel. When the branches 506 are disposed at equi-angles, e.g., at a right angle with the central axis, then as the actuator receives pressurized air, the laminated actuator curls at right angles with the central flow conduit 504 of the channel, as illustrated in FIG. 4C. However, if the slanted branches 506 are at less than a right angle with the central axis, (e.g., the smaller of the angles 510a and 510b between the slanted branches 506 and the central axis is an acute angle), then as the actuator receives pressurized air, the thin actuator would twist, as illustrated in FIG. 5B, because the actuator curls at an acute angle with respect to the central axis.

As the angle between the central axis and the slanted branches 506 becomes smaller, e.g., more acute, the thin actuator twists at a sharper angle (the actuator twists faster as a function of input pressure.) For example, if the input pressure is 2 psi, an actuator having slanted branches 506 at 60 degrees with the central axis would twist more compared to an actuator having slanted branches 506 at 80 degrees with the central axis pressurized to 2 psi.

In some embodiments, the orientation in which the thin actuator curls depends on which of the two angles 510a and 510b is smaller. For example, if the angle 510a is smaller than the angle 510b, then the actuator 502 would twist in a counter-clockwise direction, as illustrated in FIG. 5B. However, if the angle 510a is larger than the angle 510b, then the actuator 502 would twist in a clockwise direction.

In some embodiments, a single channel can encode different types of motions. For example, a top portion of a channel can include slanted branches at a right angle with respect to the central axis, which would induce a curling motion at right angles to the central axis. However, a lower portion of the channel can include slanted branches at 45 degrees with the central axis, which would induce a twisting motion. Therefore, different parts of the actuator can be encoded with different motions using different channel structures.

Figure 6A:
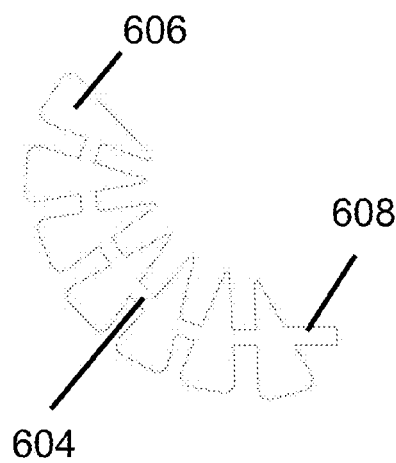
FIGS. 6A-6B illustrate a radially curling thin soft robot and its movement in accordance with some embodiments.
Figure 6B:
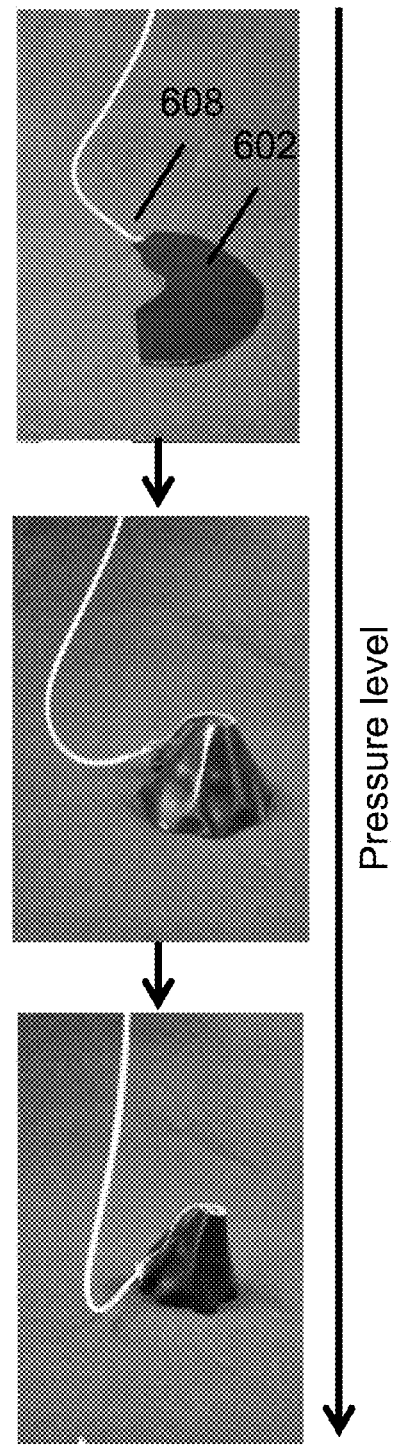

In some embodiments, a channel can be arranged in a radial manner to encode a radial curling motion in thin soft robots. FIGS. 6A-6B illustrate a radially curling thin soft robot and its movement in accordance with some embodiments. FIG. 6A shows a channel embedded in a radially curling thin soft robot 602. As illustrated in FIG. 6A, the twisting thin soft robot 602 can include a channel shaped as a tree arranged in a radial manner, having a curved central axis 604 with pie shaped branches 606, e.g., the channels or "branches" are larger on the outside of the curved line defined by the curved central axis and taper to a smaller size on the inside of the curved line defined by the curved central axis. The arrangements of the pie shaped branches 606 with respect to the shape of the robot 602 determines the motion of the thin soft robot 602 as it receives pressurized air via a gas inlet 608, as illustrated in FIG. 6B.

FIGS. 7A-7B illustrate a lifting thin robot that is configured to lift the center portion of the actuator in accordance with some embodiments. The ability to elevate the center portion of the flat soft robotic allows object placed on the robotic to be raised or elevated. FIG. 7A shows a channel structure associated with the lifting thin robot. The lifting thin robot 702 can include radial channels 704 arranged in a concentric manner about a central point, and connecting channels 706 perpendicular to the radial channels 704. Upon pressurization, the radial channels 704 deflect away from the surface of the strain-limiting layer. When the soft robotic is positioned so that the strain-limiting layer faces upward, actuation causes the elastic layer to deflect downward into the plane of the underlying supporting surface, thereby elevating the central section 708. Cross channels 706 can provide mechanical support for the soft robot during actuation. FIG. 7B shows a lifting motion of the lifting thin robot 702 as the pressure level increases. In this example, the mass of the cup is 12.1 grams.

Figure 8A:
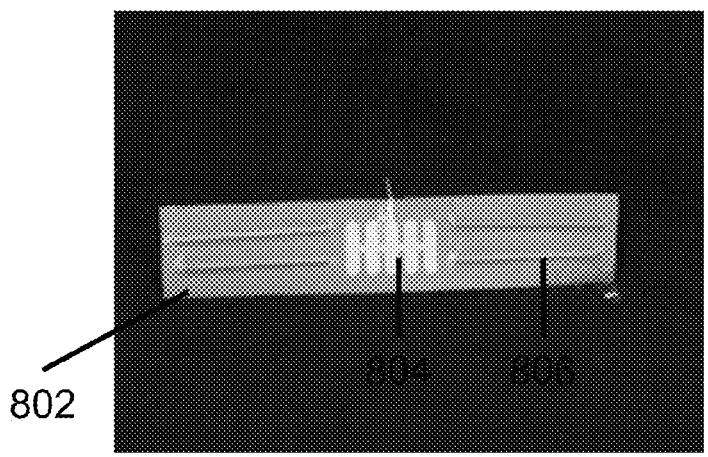
FIGS. 8A-8B show a thin actuator with augmented support structures in accordance with some embodiments.
Figure 8B:
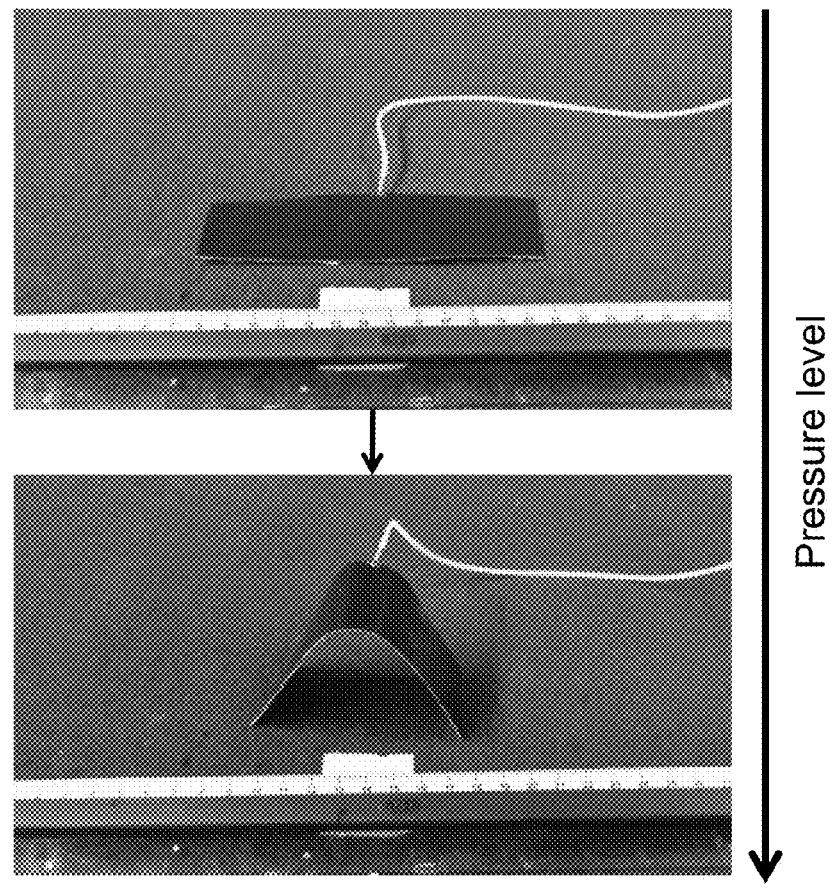

In some embodiments, a thin soft robot can be reinforced to strengthen the limbs of the laminated actuator and to provide additional physical support. FIGS. 8A-8B show a thin actuator strengthened with reinforcing beams in accordance with some embodiments. As shown in FIG. 8A, the thin actuator 802 includes a pneumatic channel 804 for providing actuation and one or more reinforcing structures 806. Upon pressurization, the pneumatic channels 804 induce bending motion, as discussed in FIG. 4C. The reinforcing structures 806 provide an additional strength to the actuator 802. The reinforcing structures 806 can be particularly useful when the inflatable layer and the strain-limiting layer do not have sufficient mechanical strength to support the entire structure, or when the pneumatic channels 804 do not encompass the entire thin actuator 802 and the actuation force is then transferred along the length of the actuator. The support structure can include arches, beams, or columns formed using stiff materials, including wood, metals, plastic or a tape. FIG. 8B shows the movement of the thin robot 802 upon pressurization. The thin robot 802 may only curl in regions with the pneumatic channels 804; the rest of the thin robot 802 made rigid by the reinforcing structures 806. As reinforced, the 'legs' of the actuator are able to support the mass of the thin robot 802.

Figure 9:
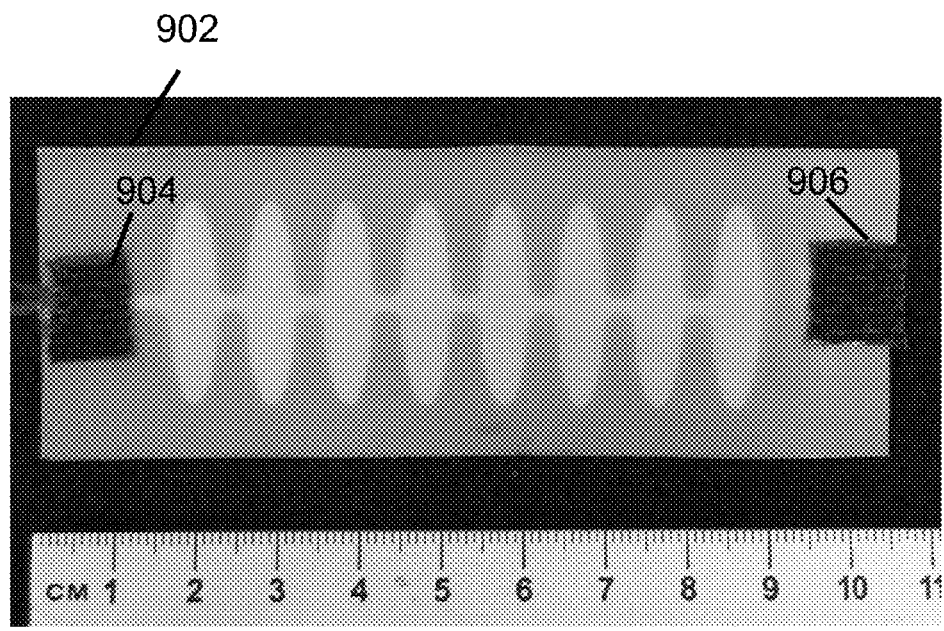
FIG. 9 illustrates a flexible, undulating actuator capable of an undulating motion in accordance with some embodiments.

Flexible robotic actuators can be designed to be capable of complex motions. FIG. 9 illustrates a flexible, locomoting actuator capable of an undulating motion that allows the device to move across a surface in accordance with some embodiments. The locomoting actuator 902 can include a curling actuator, substantially as illustrated in FIG. 4C. The strain-limiting layer of the curling actuator can include a duct tape and/or a strip of transparency tape, and the inflatable layer of the curling actuator can include a latex rubber and/or paper. The adhesive layer can be shaped to provide a plurality of interconnected channels, as in the curling actuator 402 of FIG. 4A. The bottom surface of the undulating actuator 902 further includes walking pads 904, 906. The walking pads 904, 906 were cutout from a brush for removing lint. The walking pads 904, 906 include asymmetrically aligned bristles that are aligned to lie flat against the pad surface when moved in one direction so that movement occurs freely and to engage the underlying surface and resist movement when moved in the opposite direction. The actuator is periodically pressurized, initiating the bending motion. However, because of the walking pads, walking pad 906 remains anchored on the surface and walking pad 904 curls up to it. As pressure is released and the actuator unbends, walking pad 904 now remains anchored to the underlying surface and walking pad 906 slides forward to unbend the actuator. By cyclically actuating and releasing the device, the actuator moves in a predetermined direction (i.e., left to right).

In some embodiments, a robot can perform complex motions when its thin actuators are provided with appropriate instructions. For example, one or more of its thin actuators can be actuated independently to provide desired complex motions. FIGS. 10A-10E illustrate a robot having a plurality of thin actuators in accordance with some embodiments. The robot has three bending actuators stacked over each other. Each curling actuator in the robot has a strain-limiting layer, an inflatable layer, and an adhesive layer. The strain-limiting layer can include a duct tape, and the inflatable layer can include a latex rubber and/or paper. The adhesive layer can be shaped to provide a plurality of interconnected channels 406, as in the curling actuator 402 of FIG. 4A.

Figure 10A:
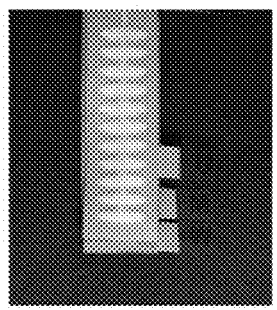
FIGS. 10A-10E illustrate a robot having a plurality of thin actuators in accordance with some embodiments.
Figure 10B:
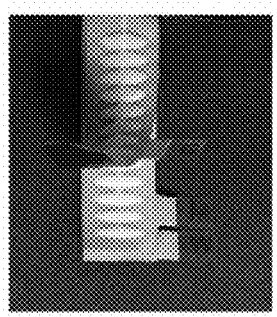
Figure 10C:
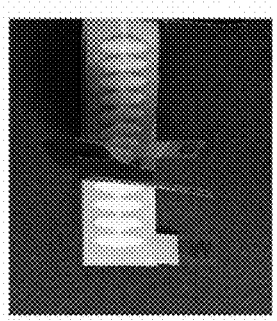
Figure 10D:
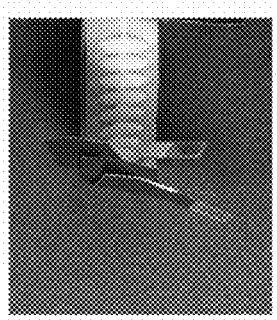
Figure 10E:
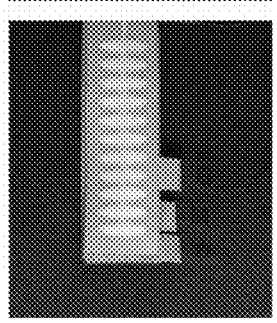

Each of the bending actuators in the robot can receive different motion instructions. For example, each of the bending actuators can be independently pressured at different pressures at different times to be controlled independently. For instance, in FIG. 10A, all the bending actuators are in their resting state. In FIG. 10B, the top bending actuator is pressurized, providing a curling motion; in FIG. 10C, both the top bending actuator and the middle bending actuator are pressurized, thereby providing a curling motion to both the top bending actuator and the middle bending actuator; in FIG. 10D, all the bending actuators are pressurized, providing a curling motion to all the actuators; and in FIG. 10E, all the bending actuators are depressurized, so all the bending actuators return to their resting states.

A plurality of thin robot actuators can be assembled into a single robot to provide a robot capable of complex motions. FIGS. 11A-11D illustrate a flexible gripper device having three bending actuators in accordance with some embodiments. The gripper of FIG. 11 has three bending actuators, each bending actuator having a strain-limiting layer, an inflatable layer, and an adhesive layer. The bending actuators in the gripper can be designed to satisfy certain mechanical characteristics, such as the strength of the grip upon actuation. The strain-limiting layer can include a duct tape and/or a strip of transparency, and the inflatable layer can include a latex rubber and/or paper. The adhesive layer can be shaped to provide a plurality of interconnected channels 406, as in the curling actuator 402 of FIG. 4A.

Figure 11A:
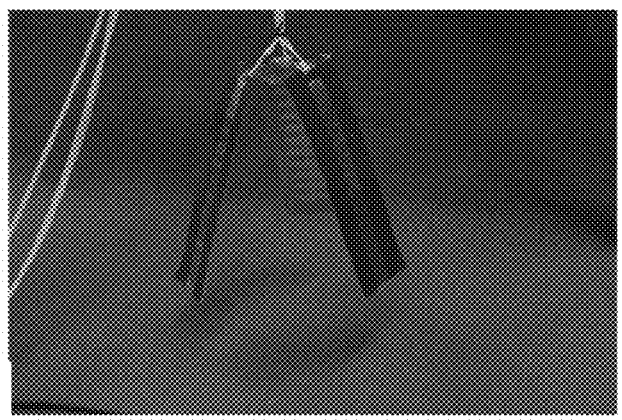
FIGS. 11A-11D illustrates a flexible gripper device having three curling actuators in accordance with some embodiments.
Figure 11B:
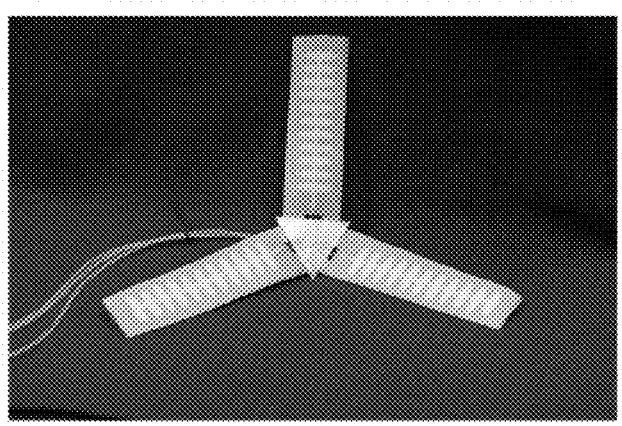
Figure 11C:
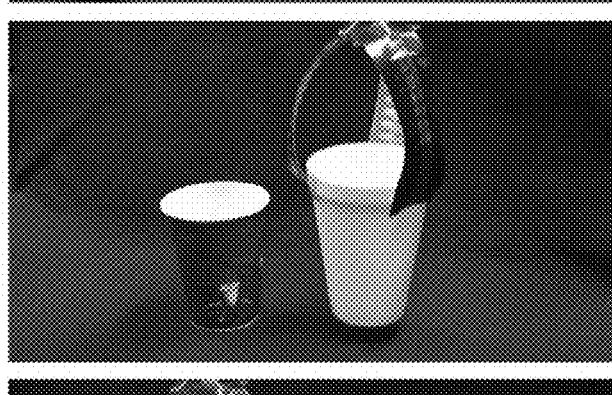
Figure 11D:
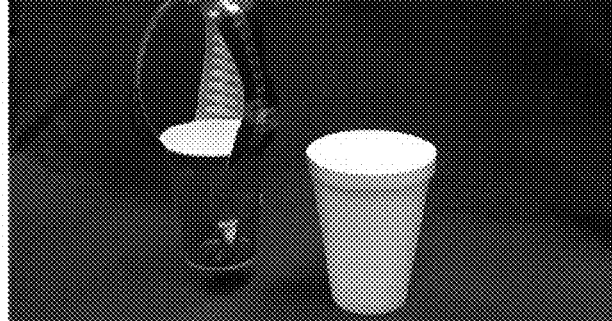

FIG. 11A shows the gripper suspended by at least one silicone tubing in fluid communication with one or more bending actuators. The silicon tubing can be configured to provide fluid to one or more curling actuators in the gripper. In some embodiments, each silicon tubing can be coupled to one bending actuator, thereby providing independent control of the bending actuators in the gripper. In other embodiments, silicone tubings can be coupled to all bending actuators, thereby providing higher pressure to the curling actuators. FIG. 11B shows the underside of the gripper in accordance with some embodiments. The gripper can include a triangular piece of acrylic at the center. The triangular piece of acrylic can be configured to provide fluid to all the bending actuators using a single fluid inlet coupled to the pressure source. FIGS. 11C-11D illustrate the operation of the gripper. In FIG. 11C, the gripper picks up a Styrofoam cup; in FIG. 11D, the gripper picks up a paper cup. In both of these cases, the grippers were pneumatically pressurized at approximately 34 kPa (5 psi).

In some embodiments, the gripper can be operated to perform a walking motion. For example, one or more of the actuators in the gripper can be actuated independently or in concert to mimic a walking motion. In some embodiments, the gripper can perform its walking motion to move to a location proximate to an object of interest, and subsequently use its actuators to grab the object of interest.

Figure 12:
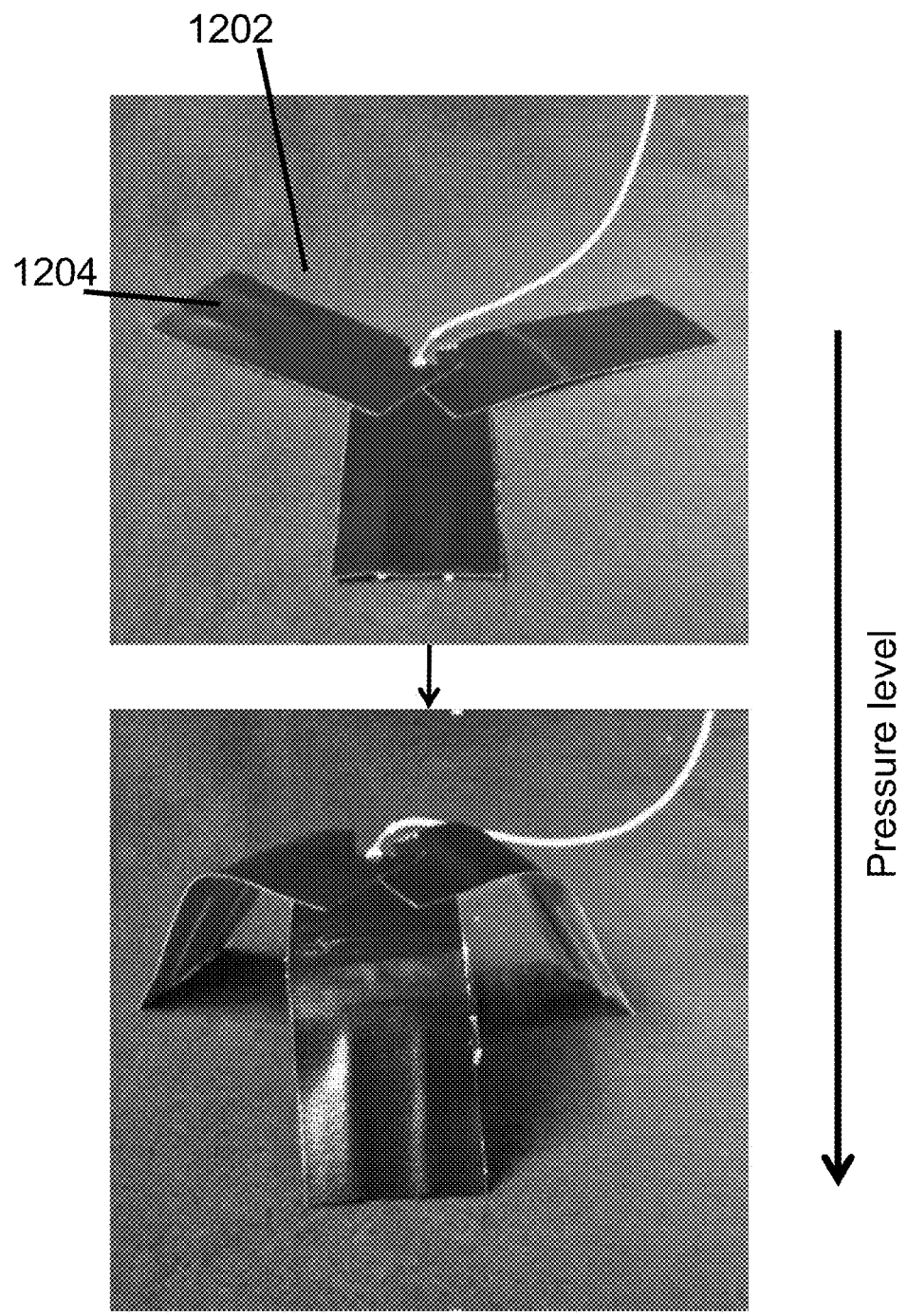
FIG. 12 shows a physical support robot in accordance with some embodiments.

FIG. 12 shows a soft robot capable of supporting itself in accordance with some embodiments. The self-supporting robot 1202 can include two or more thin actuators 1204 capable of providing a physical support. The self-supporting robot 1202 can support an object at a raised position when its thin actuators 504 receive pressurized air. The thin actuators 1204 can include a bending robot 402 and/or a partially bending robot 802.

Figure 13:
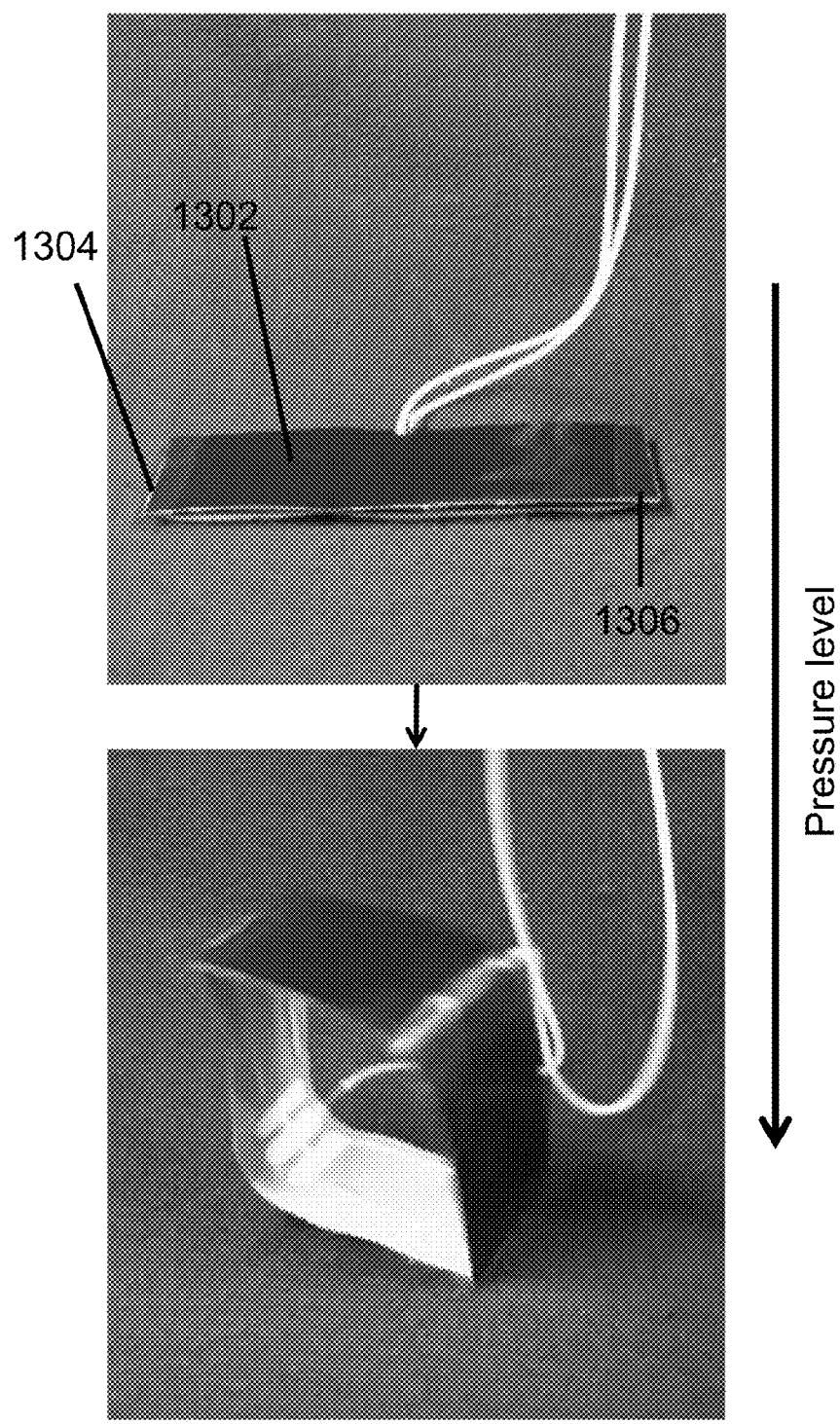
FIG. 13 illustrates an expanding robot that provides an expanding movement in accordance with some embodiments.

FIG. 13 illustrates an expanding robot that provides an expanding movement in accordance with some embodiments. The expanding robot can include two or more thin actuators 1302 stacked on top of one another, but are arranged to physically repel one another upon actuation, as illustrated in FIG. 13. To ensure that the thin actuators 1302 stay as one piece even upon actuation, the thin actuators 1302 can be adhered to one another. In some embodiments, the thin actuators 1302 are adhered to one another using an adhesive tape 1304. The thin actuators 1302 can include a bending robot 402 and/or a partially bending robot 802. In some cases, the expanding robot 1302 can be useful for separating two objects for a desired period of time. For example, during a surgical operation, the expanding robot 1302 can separate two organs for a desired period of time to provide a line of sight for surgeons. In another example, the expanding robot 1302 can provide a jumping motion when it receives a pulse of pressurized air.

Figure 14:
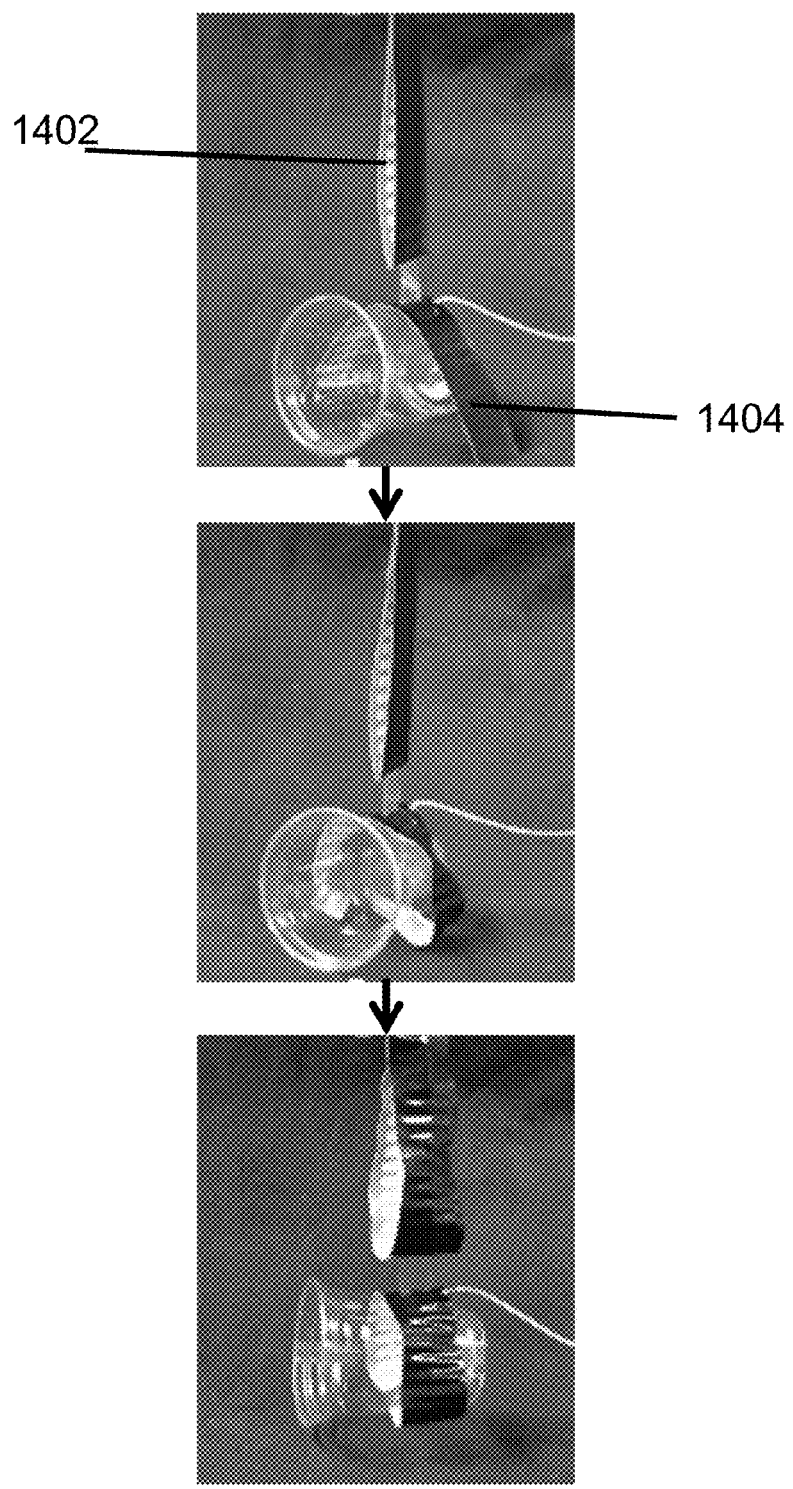
FIG. 14 illustrates a robot having one or more actuators configured to perform a predetermined task in accordance with some embodiments.

In some embodiments, a robot can include one or more of its actuators that are preconfigured to perform a predetermined task. FIG. 14 illustrates a robot having one or more actuators configured to perform a predetermined task in accordance with some embodiments. This robot includes four actuators: pulling actuators 1402 are configured to pulling the robot vertically and grabbing actuators 1404 are configured to grabbing an object. The actuators 1402 and 1404 can be physically coupled to one another using, for example, a tape. Based on motion instructions, each of these actuators can be actuated independently or in concert with one another. In the top figure, the grabbing actuators 1404 are placed over a cup, and in the middle figure, the grabbing actuators 1404 grabs the cup. Then in the bottom figure, the grabbing actuators 1404 are raised using the pulling actuators 1402.

Figure 15A:
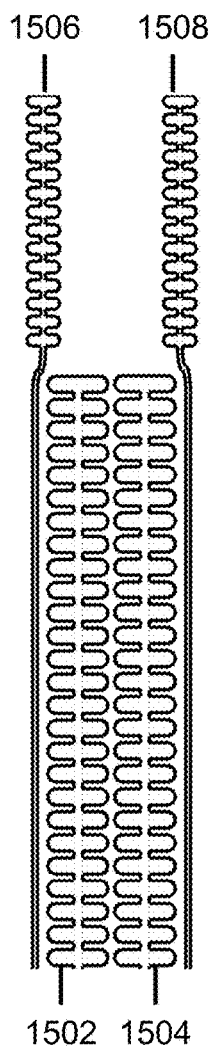
FIGS. 15A-15B illustrate an actuator with a plurality of channels in accordance with some embodiments.
Figure 15B:
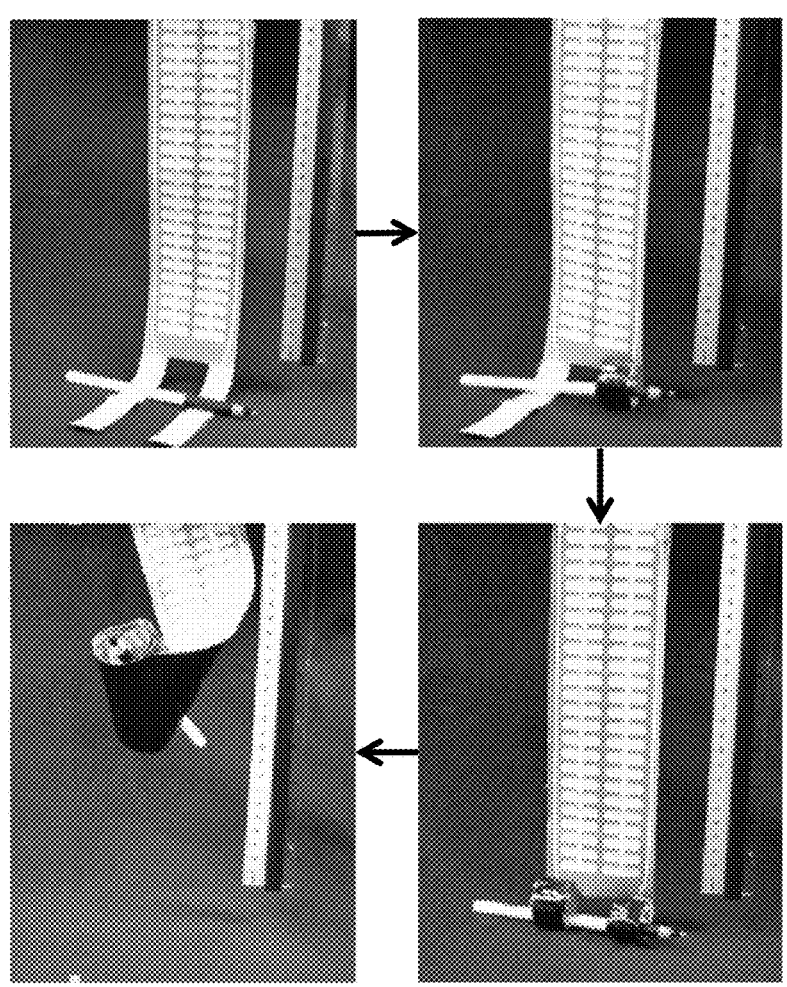

In some embodiments, a robot can include a plurality of channels, and one or more of the channels can be pressurized independently to actuate different parts of the robot. FIGS. 15A-15B illustrate an actuator with a plurality of channels in accordance with some embodiments. FIG. 15A shows the channel structure in the actuator. The actuator has four channels 1502, 1504, 1506, and 1508. The two channels 1502 and 1504 form the pneumatic channel for controlling the body of the actuator, and the remaining two channels 1506 and 1508 form the pneumatic channel for controlling the limbs of the actuator. FIG. 15B illustrates the motion of the actuator for a certain motion instruction. At a rest position, the actuator's limb is placed below a pen. Subsequently, the pneumatic channel in each limb 1506 and 1508 can be independently pressurized to grab the pen, and the body channels 1502 and 1504 can be pressurized to hold and lift the pen. The actuator weighs 13.5 g and is about 0.35 mm thick. This particular implementation of the actuator can lift objects up to 10 g in weight. However, the strength of the actuator can be controlled by using different materials for the inflatable layer and the strain-limiting layer, and also by using highly pressurized gas to pressurize the pneumatic channels.

Figure 16A:
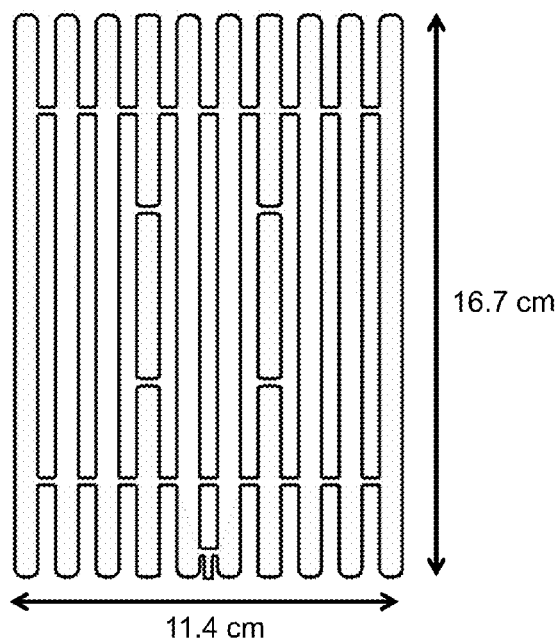
FIGS. 16A-C and 17A-D illustrate a glider with a plurality of thin actuators in accordance with some embodiments.
Figure 16B:
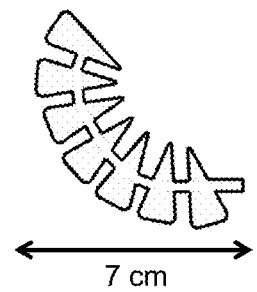
Figure 16C:
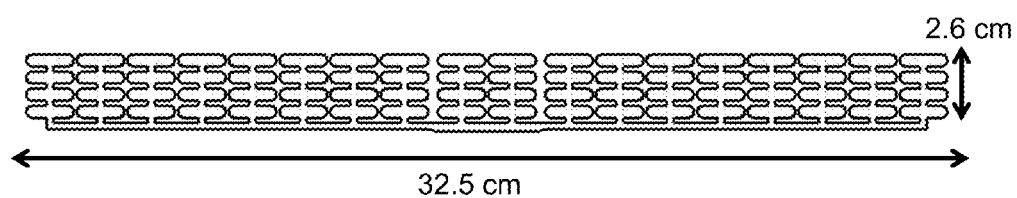
Figure 17A:
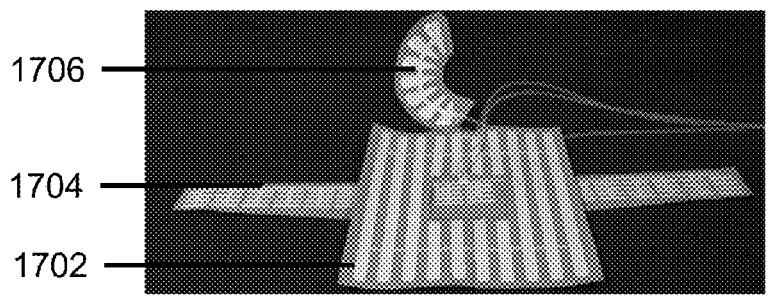
Figure 17B:
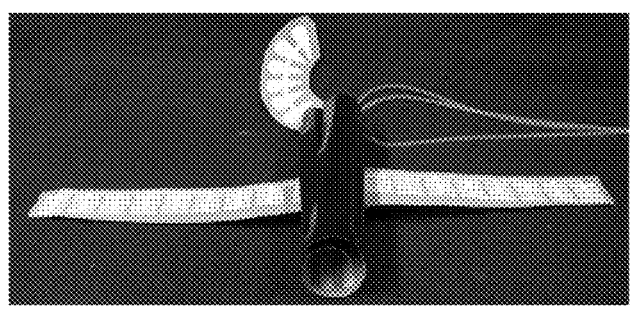
Figure 17C:
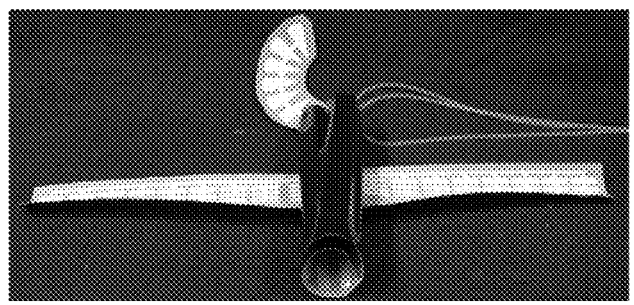
Figure 17D:
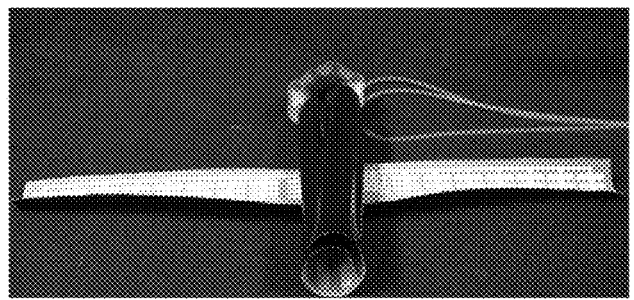

FIGS. 16 and 17 illustrate another robot with a plurality of thin actuators in accordance with some embodiments. The illustrated robot is a glider having three parts: a body, a wing, and a nose. FIGS. 16A-16C illustrate the channel structure for the body, the wing, and the nose, respectively. The channels for the body are configured to roll the body part into a cylinder; the channels for the wing are configured to actuate the wing into an airfoil shape; and the channels for the nose is configured to form a cone that caps one end of the rolled body. FIG. 17A illustrates the body 1702, the wing 1704, and the nose 1706 for the glider. The wing 1704 is attached to the body 1702 by physically weaving a portion of the wing 1704 onto the body 1702. FIG. 17B-17D illustrate the motion of the robot. In FIG. 17B, the body 1702 of the glider is rolled up to form a cylinder; in FIG. 17C, the wing 1704 is actuated to form an airfoil shape; and in FIG. 17D, the nose is actuated to form a cone that caps one of the rolled body. This implementation of the glider weighs about 22.6 g and is about 0.35 mm thick. In some embodiments, the glider structure can be used as an ultra-light aircraft, a water strider, or any other robots that may advantageously leverage the light weight characteristics of the thin actuators.

The thin actuators can provide new mechanisms for controlling aerodynamic characteristics of an object. FIG. 18 illustrates how flexible actuators provide control of an aerodynamic structure in accordance with some embodiments. FIG. 18A illustrates a rotor 1802 having a body and a plurality of flexible actuators 1804, where the body and the flexible actuators 1804 are formed using papers. The rotor 1802 is designed so that when dropped, the rotor 1802 would spiral downward.

To understand the effect of flexible actuators 1804, the rotor 1802 was dropped multiple times from a fixed position, with and without the actuators pressurized, and the aerodynamic properties of the rotor 1802 were characterized. The characterized aerodynamic properties include the drop time (i.e., the time it takes for a rotor to reach the ground when dropped from a fixed position) and the motion trajectory (i.e., the trajectory of a rotor when dropped from a fixed position.)

FIG. 18B shows the drop time of the rotor 1802, with and without pressurized actuators 1804. FIG. 18B illustrates that the rotor 1802 takes a longer time to reach the ground when its actuators 1804 are pressurized. This result illustrates that the actuators 1804 in the rotor 1802 can affect the drag (i.e., fluid resistance) of the rotor 1802. The motion trajectory of a rotor 1802 is indirectly characterized by observing the location at which the rotor hits the ground when dropped from a fixed position. FIG. 18C shows the drop location of rotors 1802 when their actuators 1804 are pressurized, and FIG. 18D shows the drop location of rotors 1802 when their actuators 1804 are not pressurized. These figures illustrate that the drop locations of rotors with pressurized actuators are consistent, whereas the drop locations of rotors with unpressurized actuators are highly varying. This serves as an evidence that the pressurized actuators 1804 can provide a control of motion trajectory. Therefore, these experiments illustrate that flexible robotic actuators can provide advanced mechanisms for controlling the aerodynamic properties of an object.

The flexible robotic actuator can be used in a variety of other applications. For example, the curling actuator of FIG. 4 can be used to provide a bending sheet. Also, the undulating actuator of FIG. 9 can be extended to provide an undulating motion on a surface of liquid such as water. Additionally, a flexible actuator can be used to form an acoustic medium of varying acoustic characteristics. For example, a portion of a wall can be formed using a flexible, pressurizable actuator. When the flexible actuator is at its resting state, the wall would exhibit certain sound transmission characteristics; when the flexible actuator is at its pressurized state, the wall would exhibit different sound transmission characteristics. By controlling the material properties and/or physical geometry of the flexible actuator, the wall's sound transmission characteristics can be controlled.

In some embodiments, the flexible robotic actuators can be powered using an off-board pressure source. The pressure source can include a compressed air source connected to the actuators through flexible tubing. The flexible tubing can include a silicon tubing. The flexible tubing can be meters long without loss of performance. In other embodiments, the flexible actuators can be powered by using an on-board pressure source. The on-board pressure source includes disposable compressed air cylinders or an on-board pump configured to provide fluid such as gas, fluid, or oil. The on-board pump can include an on-board mechanical air compressor, an on-board water electrolyzer, and an on-board chemical pump, as disclosed in the PCT Patent Application No. PCT/US11/61720, titled "Soft robotic actuators" by Shepherd et al., filed on Nov. 21, 2011.

In some embodiments, the pressure source coupled to the flexible robotic actuator can be controlled using software running on a computational device. The software needed for implementing the control process includes a high level procedural or an object-orientated language such as MATLAB®, C, C++, C#, Java, or Perl. The software may also be implemented in assembly language if desired. In some embodiments, the software is stored on a storage medium or device such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Other embodiments are within the following claims.

The invention claimed is:

1. A robotic actuator comprising:
   a strain-limiting layer comprising a flexible, non-extensible material;
   a sealing layer comprising a flexible, non-extensible material in a facing relationship with the strain-limiting layer, wherein a stiffness of the strain-limiting layer is greater than a stiffness of the sealing layer, wherein a portion of an un-adhered region between the strain-limiting layer and the sealing layer forms a fluid channel; and
   at least one fluid inlet, in fluid communication with the fluid channel, configured to receive pressurized fluid to cause the actuator to bend toward the sealing layer.

2. The robotic actuator of claim 1, wherein the sealing layer is selectively adhered to the strain-limiting layer to form the fluid channel.

3. The robotic actuator of claim 1, further comprising an adhesive layer disposed between the strain-limiting layer and the sealing layer, wherein the adhesive layer is shaped to selectively adhere the sealing layer to the strain-limiting layer to define the channel.

4. The robotic actuator of claim 1, wherein at least a portion of one of the strain-limiting layer and the sealing layer is coated with an adhesive to selectively adhere the sealing layer and the strain-limiting layer.

5. The robotic actuator of claim 4, further comprising a masking layer disposed between the strain-limiting layer and the sealing layer, wherein the masking layer defines a shape of the un-adhered region between the strain-limiting layer and the sealing layer.

6. The robotic actuator of claim 1, wherein the channel comprises a plurality of interconnected chambers configured to provide a twisting motion to the robotic actuator upon pressurization of the channel via the fluid inlet.

7. The robotic actuator of claim 1, wherein the channel comprises a plurality of interconnected chambers configured to provide a bending motion of the laminated robotic actuator upon pressurization of the channel via the fluid inlet.

8. The robotic actuator of claim 1, wherein a stiffness of the strain-limiting layer is configured to determine a physical strength associated with the laminated robotic actuator upon pressurization of the channel via the fluid inlet.

9. The robotic actuator of claim 1, wherein the channel comprises a plurality of interconnected chambers configured to provide two different motions of the laminated robotic actuator upon pressurization of the channel via the fluid inlet.

10. The robotic actuator of claim 1, further comprising a reinforcing structure for providing additional physical support to the laminated robotic actuator.

11. The robotic actuator of claim 1, wherein the channel comprises a plurality of sub-channels that are independently coupled to the at least one fluid inlet, thereby enabling independent pressurization of the sub-channels.

12. The robotic actuator of claim 1, wherein the channel comprises a plurality of interconnected chambers arranged along a curved central flow conduit.

13. A twisting actuator comprising a robotic actuator of claim 1, wherein the fluid channel comprises a central flow conduit and a plurality of slanted branches, and the slanted branches are at an acute angle with respect to a central axis of the actuator to cause a twisting motion of the actuator.

14. The twisting actuator of claim 13, wherein the central axis is aligned with the central flow conduit.

15. A lifting robot comprising a robotic actuator of claim 1, wherein the fluid channel comprises radial channels arranged in a concentric manner about a central point of the robotic actuator, wherein the radial channels are configured to deflect away from a surface of the strain-limiting layer upon pressurization.

16. A robot comprising a plurality of actuatable arms, wherein at least one of the plurality of actuatable arms includes a robotic actuator of claim 1.

17. A gripping device comprising a plurality of actuatable arms, wherein each of the plurality of actuatable arms includes a robotic actuator of claim 1, wherein the plurality of actuatable arms are configured to bend from a first resting position to a second actuated position upon pressurization.

18. A method for providing a robotic actuator, comprising:
   providing a strain-limiting layer having a substantially two-dimensional layer, wherein the strain-limiting layer is non-extensible;
   providing a sealing layer having a substantially two-dimensional layer, wherein the sealing layer is non-extensible, and the strain-limiting layer is stiffer compared to the sealing layer;
   determining a shape of a region at which the sealing layer is to be adhered to the strain-limiting layer; and
   adhering the sealing layer to the strain-limiting layer based on the shape of the region, thereby forming a channel for fluid communication having the shape that, upon receiving pressurized fluid, causes the actuator to bend towards the sealing layer.

19. A method of actuating a soft robotic comprising:
   providing a laminated soft robotic according to claim 1; and
   initiating a series of pressurizations and depressurizations that actuates the soft robotic to provide a predetermined motion.

20. The method of claim 19, wherein the series of pressurization and depressurizations provide a sequence of two or more predetermined motions.

* * * * *